United States Patent
Luke et al.

(10) Patent No.: US 10,965,391 B1
(45) Date of Patent: Mar. 30, 2021

(54) CONTENT STREAMING WITH BI-DIRECTIONAL COMMUNICATION

(71) Applicant: Amazon Technologies, Inc., Reno, NV (US)

(72) Inventors: Alexander Luke, Seattle, WA (US); Tyler Hobbs, Greenbrae, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 248 days.

(21) Appl. No.: 15/882,678

(22) Filed: Jan. 29, 2018

(51) Int. Cl.
*G06F 15/16* (2006.01)
*H04H 60/33* (2008.01)
*H04L 29/06* (2006.01)
*H04L 29/08* (2006.01)
*G10L 15/22* (2006.01)
*G10L 15/08* (2006.01)

(52) U.S. Cl.
CPC ............ *H04H 60/33* (2013.01); *G10L 15/08* (2013.01); *G10L 15/22* (2013.01); *H04L 65/60* (2013.01); *H04L 67/306* (2013.01); *G10L 2015/088* (2013.01); *G10L 2015/223* (2013.01)

(58) Field of Classification Search
CPC ......... H04H 60/33; G10L 15/08; G10L 15/22; G10L 2015/088; G10L 2015/223; H04L 65/60; H04L 67/306
USPC ........................................................ 709/219
See application file for complete search history.

(56) References Cited

U.S. PATENT DOCUMENTS

| | | | |
|---|---|---|---|
| 6,588,015 B1 | 7/2003 | Eyer | |
| 6,959,166 B1* | 10/2005 | Gabai | G09B 5/04 434/307 R |
| 7,028,082 B1 | 4/2006 | Rosenberg | |
| 8,428,621 B2 | 4/2013 | Vorbau | |
| 9,253,551 B1* | 2/2016 | Lewis | H04N 21/4758 |
| 9,408,996 B2 | 8/2016 | Pompilio, III | |
| 9,996,819 B1* | 6/2018 | Modi | G06F 16/90332 |

(Continued)

FOREIGN PATENT DOCUMENTS

WO    2014/015110    1/2014

OTHER PUBLICATIONS

KiSS Radio. "You Control the Music". Oct. 2017. pp. 1-3. (Year: 2017).*

(Continued)

*Primary Examiner* — Imad Hussain
(74) *Attorney, Agent, or Firm* — Hogan Lovells US LLP

(57) ABSTRACT

In various embodiments, an audio streaming system may provide bi-directional communication, in which content data is streamed from a server associated with a streaming service to a plurality of client devices and user generated audio data can also be transmitted from a client device to the streaming service over a network such as the Internet. In some embodiments, the client device includes both audio playback and voice communications capabilities such that a communication channel can be established between listeners and the streaming service via the client device and over the network. Automated speech recognition may also be used to translate the user-generated audio data into text such that the content can be further analyzed, such as to sort, categorize, rank, or filter the user-generated audio data. The user-generated audio data may also be analyzed for audio quality, such as to filter out poor quality data.

19 Claims, 13 Drawing Sheets

(56) References Cited

U.S. PATENT DOCUMENTS

| | | | |
|---|---|---|---|
| 10,034,053 B1* | 7/2018 | Trollope | H04H 60/33 |
| 10,298,640 B1* | 5/2019 | Luke | G06N 20/00 |
| 10,445,365 B2 | 10/2019 | Luke | |
| 10,528,671 B1* | 1/2020 | Robertson | G06F 16/35 |
| 2001/0034640 A1* | 10/2001 | Chaum | G07C 13/00 |
| | | | 705/12 |
| 2001/0053945 A1* | 12/2001 | Hayashi | H04H 20/38 |
| | | | 700/94 |
| 2002/0010584 A1* | 1/2002 | Schultz | G06Q 99/00 |
| | | | 704/270 |
| 2002/0053089 A1* | 5/2002 | Massey | H04N 21/4135 |
| | | | 725/135 |
| 2003/0236843 A1 | 12/2003 | Weber | |
| 2004/0002868 A1* | 1/2004 | Geppert | G10L 15/26 |
| | | | 704/277 |
| 2004/0237759 A1 | 12/2004 | Bill | |
| 2005/0245317 A1* | 11/2005 | Arthur | A63F 13/87 |
| | | | 463/42 |
| 2005/0265527 A1* | 12/2005 | Creamer | H04L 12/66 |
| | | | 379/92.02 |
| 2006/0015560 A1* | 1/2006 | MacAuley | A63F 13/87 |
| | | | 709/206 |
| 2007/0106726 A1* | 5/2007 | Rosenberg | H04M 3/56 |
| | | | 709/204 |
| 2007/0214471 A1* | 9/2007 | Rosenberg | H04H 60/33 |
| | | | 725/24 |
| 2008/0101765 A1 | 5/2008 | Lee | |
| 2008/0120616 A1* | 5/2008 | James | G06F 3/16 |
| | | | 718/100 |
| 2008/0242221 A1 | 10/2008 | Shapiro | |
| 2009/0112689 A1* | 4/2009 | Peterson | G06Q 30/0201 |
| | | | 705/7.29 |
| 2010/0273553 A1* | 10/2010 | Zalewski | H04L 65/4092 |
| | | | 463/31 |
| 2011/0053559 A1* | 3/2011 | Klein | G07C 13/00 |
| | | | 455/411 |
| 2012/0069977 A1* | 3/2012 | Oberoi | H04M 3/5158 |
| | | | 379/92.01 |
| 2012/0302156 A1* | 11/2012 | Anstandig | H04H 60/06 |
| | | | 455/2.01 |
| 2012/0322041 A1* | 12/2012 | Weisman | G09B 5/00 |
| | | | 434/308 |
| 2013/0073632 A1 | 3/2013 | Fedorov | |
| 2013/0191857 A1* | 7/2013 | Guinn | G06F 3/16 |
| | | | 725/24 |
| 2013/0346332 A1* | 12/2013 | Schalk | G06Q 10/1053 |
| | | | 705/321 |
| 2014/0129935 A1* | 5/2014 | Ovadia Nahon | G06F 3/01 |
| | | | 715/716 |
| 2014/0164476 A1* | 6/2014 | Thomson | G06Q 10/101 |
| | | | 709/203 |
| 2014/0229866 A1* | 8/2014 | Gottlieb | H04L 12/1822 |
| | | | 715/758 |
| 2014/0274203 A1* | 9/2014 | Ganong, III | H04W 52/0261 |
| | | | 455/556.1 |
| 2015/0289023 A1* | 10/2015 | Richman | H04N 21/25 |
| | | | 725/32 |
| 2015/0289025 A1* | 10/2015 | McLeod | H04N 21/2668 |
| | | | 725/42 |
| 2015/0382047 A1* | 12/2015 | Van Os | G10L 17/005 |
| | | | 725/38 |
| 2016/0225187 A1* | 8/2016 | Knipp | G06T 19/006 |
| 2016/0337059 A1* | 11/2016 | Nehls | G06F 3/165 |
| 2017/0124664 A1 | 5/2017 | Savenok | |
| 2017/0149711 A1 | 5/2017 | Shaw | |
| 2017/0180438 A1 | 6/2017 | Persson | |
| 2017/0221273 A1* | 8/2017 | Haseltine | G02B 27/0172 |
| 2017/0358305 A1* | 12/2017 | Kudurshian | G10L 15/22 |
| 2018/0232752 A1* | 8/2018 | BaderEddin | G10L 15/22 |
| 2018/0286426 A1* | 10/2018 | Abramson | G10H 1/40 |
| 2019/0001135 A1* | 1/2019 | Yoo | A61N 1/3603 |
| 2019/0155617 A1* | 5/2019 | Buchanan | G06F 9/4451 |

OTHER PUBLICATIONS

Martin, Taylor. "11 fun games you can play with Alexa". Mar. 16, 2016. pp. 1-5. (Year: 2016).*

Isbitski, David. "Intro to ASK and Echo". Jul. 3, 2015. p. 1. (Year: 2015).*

Amazon.com. "Alexa and Alexa Device FAQs". Jan. 5, 2017. pp. 1-3. (Year: 2017).*

Cameron, Glenn et al. "Alexa Blogs". May 27, 2016. pp. 1-39. (Year: 2016).*

Isbitski, David. "New Alexa Skills Kit (ASK) Feature: Audio Streaming in Alexa Skills". Aug. 24, 2016. pp. 1-18. (Year: 2016).*

Non-Final Office Action issued in U.S. Appl. No. 15/831,205 dated Sep. 6, 2018.

Final Office Action issued in U.S. Appl. No. 15/831,205 dated Jan. 30, 2019.

Notice of Allowance issued in U.S. Appl. No. 15/831,205 dated Apr. 2, 2019.

Non-Final Office Action issued in U.S. Appl. No. 15/882,741 dated Aug. 13, 2018.

Notice of Allowance issued in U.S. Appl. No. 15/882,741 dated Jan. 11, 2019.

International Search Report and Written Opinion issued in PCT Application No. PCT/US2018/062874 dated Feb. 26, 2019.

* cited by examiner

| Classic Rock Channel Current Listeners |||| 
|---|---|---|---|
| 302 | 304a | 304b | 304c |
| Device | Location | Interest | Other Attributes |
| Device 1 | Seattle | Artist A | ••• |
| Device 2 | Austin | Artist B | ••• |
| Device 3 | Miami | Artist A | ••• |
| Device 4 | NYC | Artist C | ••• |
| Device 5 | Boston | Artist D | ••• |
| Device 6 | Seattle | Artist A | ••• |
| Device 7 | NYC | Artist D | ••• |
| Device 8 | Houston | Artist A | ••• |
| Device 9 | NYC | Artist C | ••• |
| ⋮ | | | |
| Device *n* | Seattle | Artist B | ••• |

FIG. 3A

CONTENT STREAMING WITH BI-DIRECTIONAL COMMUNICATION

BACKGROUND

Terrestrial radio technology has been a prominent form of audio content distribution and entertainment for the last century, and is still currently used to delivery content such as many genres of music and talk shows spanning topics such as sports and news. Although many other forms of audio content distribution have become available, such as personal digital music collections and Web based streaming, many listeners still enjoy the conventional radio experience as it provides a sense of discovery, community, and interactivity. Additionally, a live radio host can introduce new songs, make announcements, tell stories, and provide other fresh content. However, conventional radio lacks the ability to obtain profiles of listeners in real time (e.g., specific tastes and preferences), and is limited to broadcasting on specific frequencies, which means all devices tuned to that frequency receive the same content. Thus, although listeners enjoy the shared-experience and community aspects of conventional radio, it lacks the ability to support a more personalized and interactive experience that may further improve the user experience.

BRIEF DESCRIPTION OF THE DRAWINGS

Various embodiments in accordance with the present disclosure will be described with reference to the drawings, in which:

FIG. 3A illustrates an example representation of profiles of devices connected to a content channel, in accordance with various embodiments of the present disclosure.

DETAILED DESCRIPTION

Figure 1:
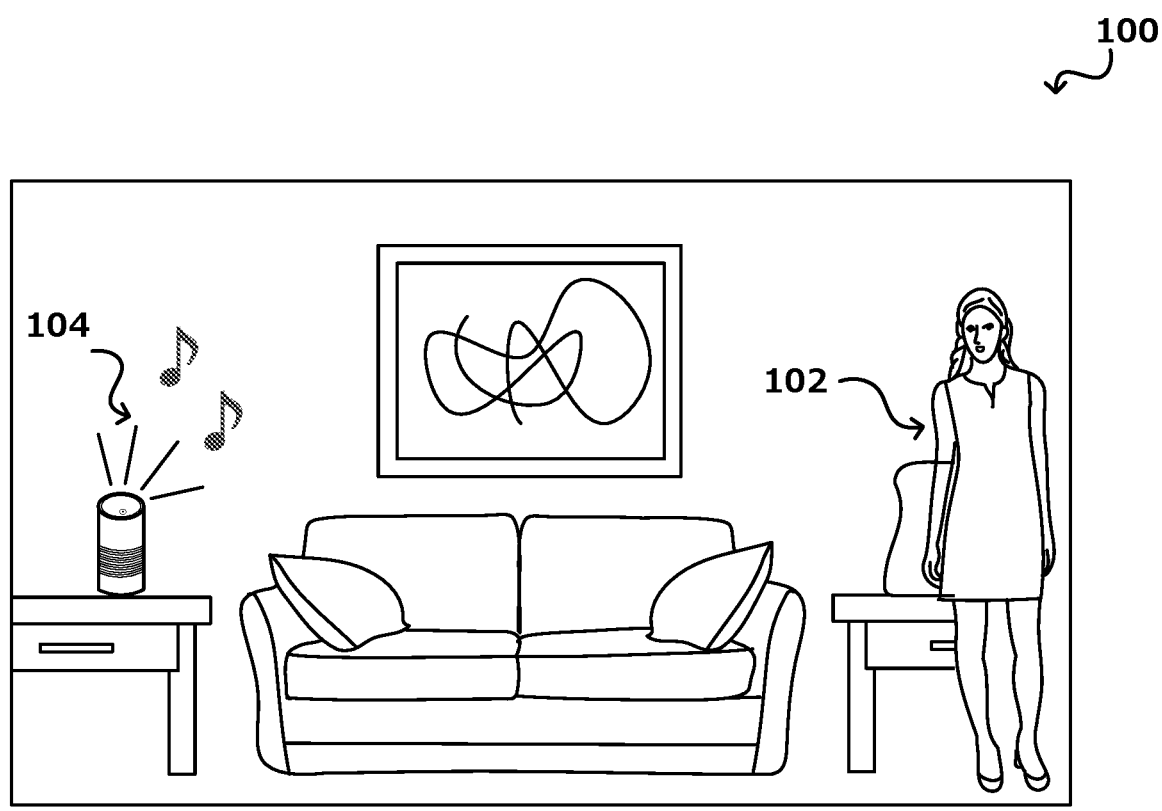
FIG. 1 illustrates an example scenario of a user listening to an audio playback device.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches for audio content distribution. In particular, various embodiments are directed to interactive audio streaming technology that provides the benefits of conventional radio, particularly the ability to receive voice responses from users in response to questions or other prompts in the streamed content. For example, the streamed content may include a prompt asking for users to vote on which song they would like to hear. The techniques provided herein would allow user to provide a response by saying out loud the name of the song they would like to hear. The response, which includes audio data of the user saying the name of the song, would be provided to the audio streaming service. In conventional terrestrial radio, listeners are often prompted to "call-in" to vote for the song they would like to hear, or to enter a contest. However, this means the user has to know the number of the radio station, use their phone to place a call, and go through various prompt during the call and provide various information in order to actually place their vote or contest entry. The present solution eliminates those steps and instead provides a streamlined listener response technique that allows users to provide vocal responses merely by saying their response and without having to perform additional actions like placing a phone call or loading an app. This allows users to provide responses with ease and convenience, which in turn provides the streaming service with increased user participation.

In various embodiments, an audio streaming system may provide bi-directional communication, in which content data is streamed from a server associated with a streaming service to a plurality of client devices (i.e., devices with which listeners use to listen to streaming content from the streaming service) and user generated audio data can also be transmitted from a client device to the streaming service over a network such as the Internet. In some embodiments, the client device includes both audio playback and voice communications capabilities such that a communication channel can be established between listeners and the streaming service via the client device and over the network. Specifically, for example, the streaming service may transmit streaming audio data to the client device that includes a prompt for listeners to provide a voice response using the client device. In some embodiments, the prompt may only be transmitted to a subset of listeners of the streaming service based on certain user attributes. The prompt may also be streamed to listeners are the same time or at different times, such as based on content scheduled or selected for individual listeners. A listener can provide such a voice response simply by directly saying their response. The utterance may be captured by a microphone on the client device and transmitted from the client device to the streaming service over the network as data. In some embodiments, the user may first say a wakeword to activate the microphone and record their response. In some other embodiments, or based on a setting selected by the user, the prompt itself may activate the microphone for a certain period of time following the prompt, such that the user can immediately say their response without having to say an additional wakeword. Once received, the response audio data representing the user response (i.e., utterance) can be processed to make various determinations. The response audio data may be processed using automated speech recognition to detect verbal content of a user response. For example, the response may be converted from audio data to text or strings, which can be further analyzed or manipulated, such detecting a vote for a certain song, an answer to a question. Thus, polls, contests, and other interactive tasks can be accomplished using the present techniques.

In various embodiments, user-generated audio data may be captured by a client device, transmitted to the streaming service from the client device over the network, and re-transmitted (i.e., streamed) to one or more client devices from the streaming service over the network. In some embodiments, the one or more client device to which the user-generated audio data is streamed includes the client device through which the user-generated audio data was captured. In some other embodiments, the user-generated audio data is not transmitted back to the client device through which it was captured. In an example, the client device may record a user saying a message, such as an "over the air shout-out" to a friend, a question for a program host or guest, or other such content. In some embodiments, the user-generated audio data may be stored and transmitted to the plurality of client devices at various later points in time, such as at a time that fits into the respective content schedules of the client devices. In some embodiments, the user-generated audio data may be streamed "live" or in real-time as the user says the message, such as to have the effect of the user speaking or announcing directly to other listeners (i.e., being "on the air"). In some embodiments, multiple users may be transmitting their respective user-generated audio data to the streaming service through respective client devices and the user-generated audio data of all of the users are transmitted to the other client device, thereby having the effect of streaming a live conversation between multiple users. In some embodiments, the user-generated audio data may be analyzed using automated speech recognitions techniques as a means of filtering out inappropriate or otherwise unsuitable content. Automated speech recognition may also be used to translate the audio data into text such that the content can be further analyzed, such as to sort, categorize, rank, or filter the user-generated audio data. The user-generated audio data may also be analyzed for audio quality, such as to filter out poor quality data.

Various other features and application can be implemented based on, and thus practice, the above described technology and presently disclosed techniques. Accordingly, approaches in accordance with various embodiments provide advancements in digital content distribution systems. In particular, approaches described herein enable streaming content with bi-directional communication. Conventional audio streaming technology provides a one-way communication experience, in which content is streamed from a server to a client device, with no means for users to seamlessly communicate back to the streaming service using voice. This was further unimaginable since audio playback devices conventionally do not include voice communications capabilities. Thus, the present systems and method represent an improvement to content streaming technology as well as audio playback device technology. Various other applications, processes, and uses are presented below with respect to the various embodiments, each of which improves the operation and performance of the computing device(s) on which they are implemented.

FIG. 1 illustrates an example scenario 100 of a user 102 listening to an audio playback device 104, in accordance with various embodiments. Although a voice communications device (e.g., an Amazon Echo) is illustrated, it should be understood that the device 104 may be various other types of electronic devices that are capable of outputting audio and which have audio playback controls. These devices can include, for example, speakers, receivers, notebook computers, ultrabooks, personal data assistants, video gaming consoles, televisions, set top boxes, smart televisions, portable media players, unmanned devices (e.g., drones or autonomous vehicles), wearable computers (e.g., smart watches, smart glasses, bracelets, etc.), display screens, display-less devices, virtual reality headsets, display-based devices, smart furniture, smart household devices, smart vehicles, smart transportation devices, and/or smart accessories, among others. In the example scenario 100 of FIG. 1, the audio playback device 104 is outputting audio, such as music. In some embodiments, the audio playback device 104 may also include a voice communications component and voice-enabled inputs.

As will be described further herein, such devices may utilize a wakeword or other predetermined sound profile to activate some functionality (e.g., send data to a remote device, such as audio input data for speech analysis) as well as button-activated devices that utilize a button (graphical, physical, or both) to enable some audio-related functionality (e.g., a sound-capturing and sending mode). In this example, the user 102 can speak a request within an environment where the device 104 is located. The request may be any question, inquiry, instruction, phrase, or other set of one or more words/sounds. For example, the user may say, "Wakeword, play "Yellow Submarine". In this example, the word "Wakeword" has a special connotation, in that it may be referred to as a wakeword, or activation word (the wakeword would be a different word, or a particular phoneme or a particular sound, such as the sound made by clapping or snapping your fingers). In particular, a wakeword may be detected within audio input data detected by one or more microphones located on the device 104. Persons of ordinary skill in the art will recognize, however, that the one or more microphones may alternatively be located on a separate device in communication with the device 104. In some embodiments, after the wakeword is detected, the device 104 may begin interpreting/analyzing audio input data until no more speech is detected. In general, the device 104 constantly listens for the wakeword and is otherwise inactive.

Once the wakeword is recognized, the device 104 switches from a passive mode to an active mode. It should be noted that the wakeword does not have to be the first word or sound in a given sentence or request. In this example, the audio data comprising a request is sent over a network (e.g., the Internet) to a destination such as a resource provider environment (e.g., a cloud computing environment). As discussed further herein, resource provider environment may comprise various servers, virtual machines, services, applications, and/or processes such as those related to automatic speech recognition, natural language understanding, text-to-speech functionality, and other applications. In addition, in various embodiments resource provider environment may also comprise a music listening service (e.g., an online music service, an online radio station, etc.) or be in communication with a music listening service such that audio control commands and/or command contexts may be performed on music stored at or available to the music listening service. In other embodiments, music may be stored at or available to the audio playback device 104 that is capable of receiving and acting on commands.

Figure 2:
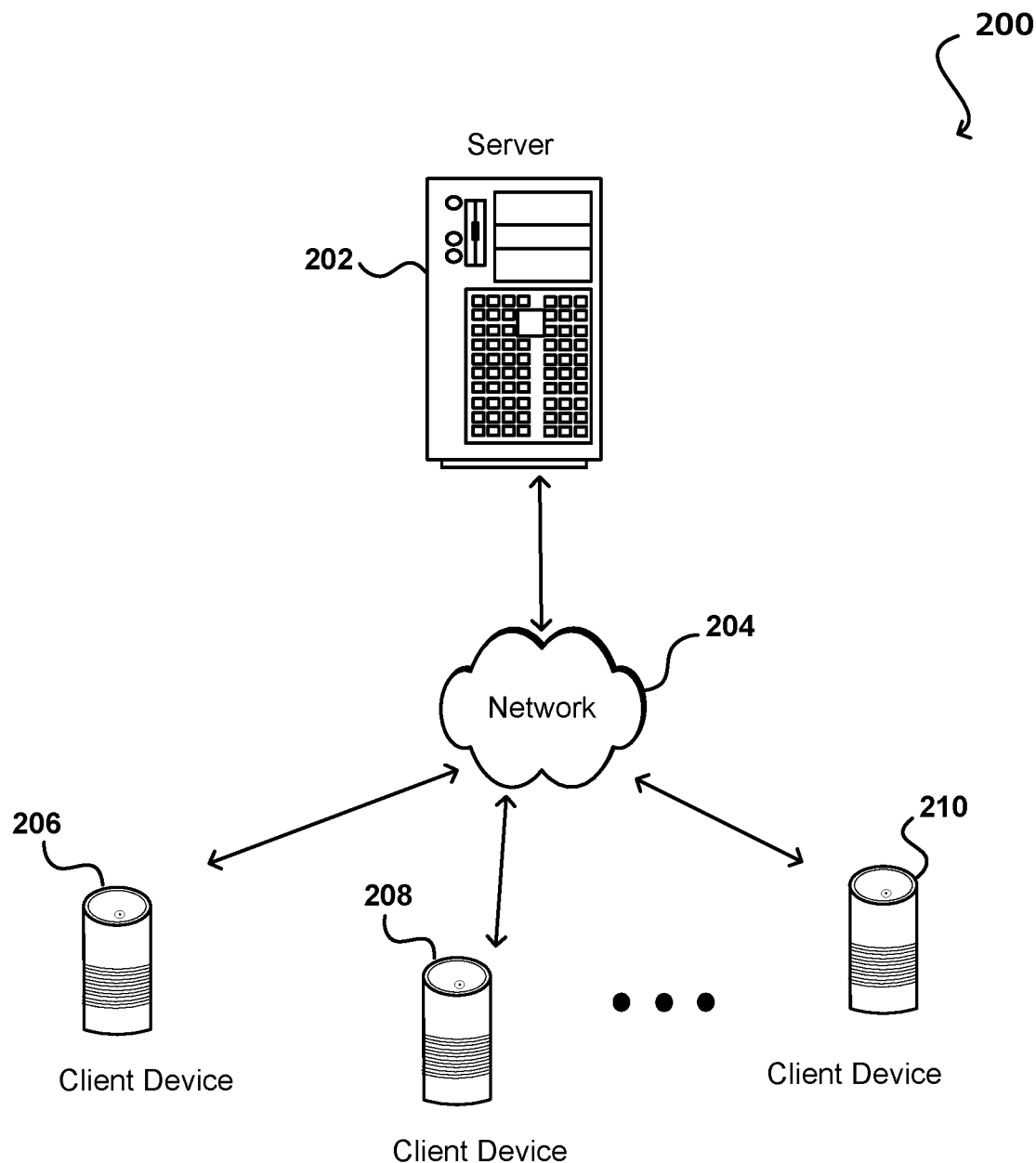
FIG. 2 illustrates an example of a networked computing system for content streaming, in accordance with various embodiments of the present disclosure.

FIG. 2 illustrates an example of a networked computing system 200 for content streaming. In this example, a server 202 (or a plurality thereof), such as at a resource, service, or content provider can transmit content or data (e.g., audio data) to one or more client devices 206, 208, 210 such that audio can be rendered and played at the client devices 206, 208, 210. Client devices 206, 208, 210 include devices through which a user can watch, listen to, read, or otherwise interact with content, and include at least one form of input such as a keyboard, a touchscreen, a voice communications component such as a microphone, and at least one form of output such as a display or speaker. The client devices 206, 208, 210 can include various computing devices such as speakers, receivers, smart phones, tablet computers, wearable computers (e.g., smart glasses or watches), desktop or notebook computers, and the like. The client devices 206, 208, 210 can communicate with the server 202 over at least one network 204, such as the Internet, a cellular network, a local area network (LAN), an Ethernet, Wi-Fi, or a dedicated network, among other such options, such that the client devices 206, 208, 210 can communicate with the server 202. In various embodiments, the server 202 may represent an audio streaming service capable of streaming data to the client device 206, 208, 210, where it is rendered into audio. In some embodiments, the audio streaming service may provide a plurality of channels for streaming various types of content, such as music, news, and sports. The client devices 206, 208, 210 may connect to one of the channels via the network such as the Internet to play content streaming on that channel. When a client device is connected to a channel or a streaming service in general, the client device may receive a mix of content, some of which is streamed across all devices connected to the channel or streaming service, and some of which is personalized for the particular client device based on a user or device profile associated with the client device.

FIG. 3A illustrates an example representation 300 of profiles of devices connected to a content delivery channel, in accordance with various embodiments. In this example, a plurality of client devices are connected to a channel of a streaming service. The channel, or content provider associated with the channel may receive respective profiles 302 associated with client devices, in which the profiles include various attributes 304 associated with the client devices. The attributes 304 of a client device may include a wide range of data, such as a geographic location 304a or region of the client device, an interest 304b, such as an affinity for a certain artist and type of music. Other attributes 304c may include additional interests that may dictate what type of content that respective listener might like, bio-data such as gender and age, historic interaction or behavior data such as usage data and user interactions or responses to certain content, and the like. In some embodiments, a client device may be associated with a user account, which provides some of the attributes 304, such as those that are associated with the user rather than dependent on the device used to access the streaming service. Other attributes 304 may be determined based on the device rather than the user account, such device type, current location, and the like.

The profile 302 of a client device may include a large amount of data that can be used to determine content that may be favorable to the respective listener. The data may include user-designated attributes (e.g., preferences) or learned attributes. For example, a learned attribute may include an affinity for a certain sub-genre of music or particular sound that is determined based on the songs that the user specifically request, songs that the user skips, and other such behavior, without such an affinity being explicitly expressed by the user. The attributes associated with the client devices can be used to segment the client devices into groups and for determining the group content of the respective groups, as well as the individual content for the respective individual client devices. In the example channel of FIG. 3A, different types of content can be streamed to audio devices connected to that channel, including channel content, group content, and individual content, as respectively illustrated in FIGS. 3B, 3C, and 3D. In various embodiments, a certain streaming period (e.g, an hour of programming), a device may play a period of channel content, a period of group content, and a period of individual content. For example, channel content may be streamed to all the devices for a certain duration, then personalized content (i.e., grouped content and/or individual content) is streamed to the devices, and then the devices are synced back into all receiving the channel content.

In some embodiments, a single device may be associated with multiple user accounts or profiles. Thus, for those devices, the attributes may include a combination of the attributes of all the associated profiles or determined based on the attributes of the associated profiles. In some embodiments, multiple users may be associated with a single user account or device. Separate and/or combined profiles for the multiple users may be available. Thus, the personalized content may be selected for one, all, or a subset of the multiple users. In some embodiments, the current user of the device may be determined based on voice recognition, and the personalized content may be determined for the current user. In some embodiments, a voice command may request content personalized for one or more specific users, for example "Please play music for John and I". In this example, the system may be able to determine the use referred to by "John" and also be able to recognize the user referred to by "I" through voice recognition, and determine personalized content based on attributes associated with the two identified users.

Figure 3B:
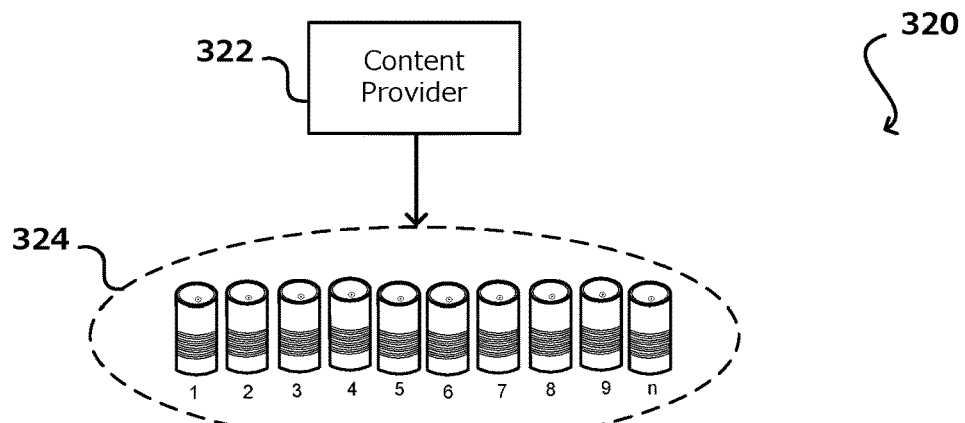
FIG. 3B illustrates an example representation a first aspect of a content delivery scheme, in accordance with various embodiments of the present disclosure.

FIG. 3B illustrates an example representation 320 a first aspect of a content delivery scheme, in accordance with various embodiments. Specifically, FIG. 3B illustrates the delivery of channel content from a content provider 322 to all devices 324. Channel content refers to same content that is streamed to all of the audio devices that are connected to the channel. For example, for a music channel, channel content may include songs or host announcements that are streamed to all devices on the channel, projecting the feel of traditional radio. In some embodiments, channel content may be played on all of the devices 324 at around the same time, such as to simulate the shared experience of traditional radio. More specifically, streaming of the channel content to each of the devices 324 may be synced to a certain syncing window, such that channel content is streamed to each of the devices at some point within the syncing window. In one example, the channel content is streamed to all of the devices 324 at the same time. In another example, the channel content is streamed to the devices at various offsets, such as a few seconds or minutes apart. This offset may occur when personalized content previously streamed to the devices (e.g., group content or individual content) may have different durations and thus end at different times. Accordingly, the channel content streamed to the devices following such content begins at different times, respectively. In various embodiments, the channel content includes a data stream of live content, pre-recorded content, listener-generated content received through the first client device, or a combination thereof. For example, a host may record an announcement (e.g., "DJ break") or other commentary to be transmitted as channel content. The recording may be saved and transmitted to client devices at respective times within the syncing window. In some embodiments, or for some devices, the recording may be streamed to the devices immediately or as it is recorded, thereby providing live content. In some embodiments, a client device may record a length of audio of a listener, such as an announcement or "shout-out", transmit that audio to the server, where it is streamed to other client devices. This further provides a community experience, allowing listeners to interact not only with the provider, but also with each other. One or more songs may also be selected to be channel content and transmitted to the client devices accordingly.

Figure 3C:
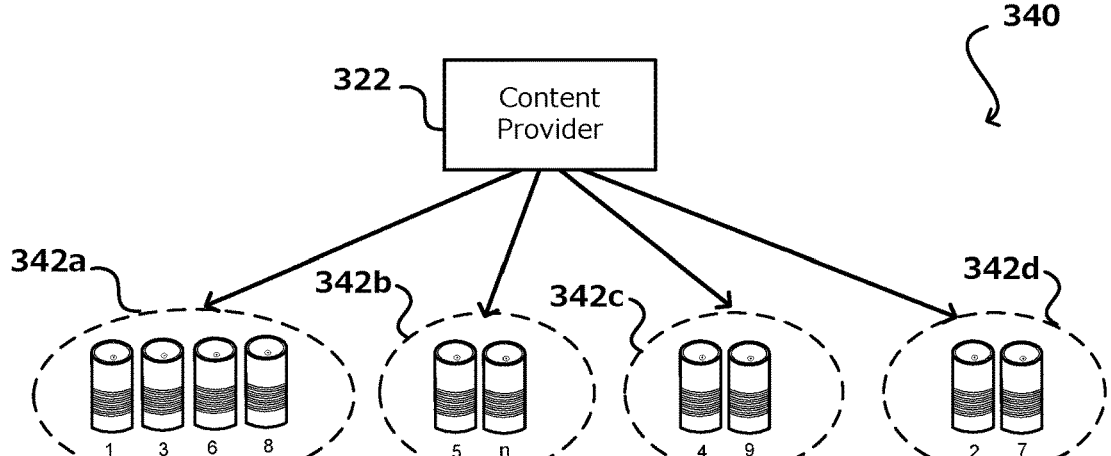
FIG. 3C illustrates an example representation a second aspect a content delivery scheme, in accordance with various embodiments of the present disclosure.

FIG. 3C illustrates an example representation 340 a second aspect a content delivery scheme, in accordance with various embodiments. Specifically, FIG. 3C illustrates the delivery of group content from the content provider 322 to groups of devices 342a, 342b, 342c, 342d. Group content refers to content that is streamed only to a subset of the audio devices that are connected to the channel. In some embodiments, the devices connected to the channel may be segmented into multiple groups 342a, 342b, 342c, 342d, with each group receiving different content selected specifically for that group. The devices may be grouped based on various attributes of profiles associated with the devices. For example, the devices may be grouped based on geographic region, affinity for certain artists, or other attributes. In this example scenario, the devices connected to the channel may be segmented into four different groups 342a, 342b, 342c, 342d based on the "top artist" attribute associated with the devices. In another example, the devices can be grouped based on geographic region and the group content delivered to the respective groups can include announcements or commentary relevant to the respective geographic region. In some embodiments, groups may be determined based on a combination of attributes, such as "fans of The Beatles located on the west coast".

Figure 3D:
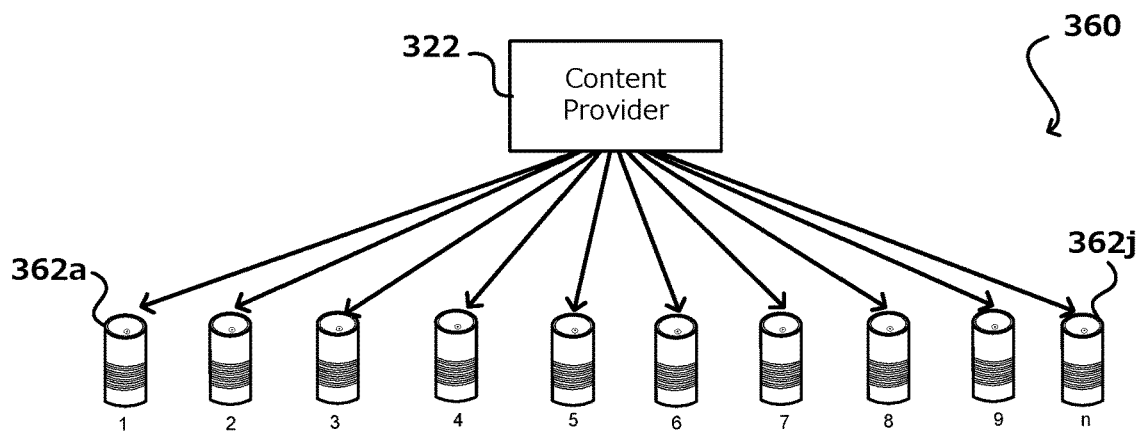
FIG. 3D illustrates an example representation a third aspect of a content delivery scheme, in accordance with various embodiments of the present disclosure.

FIG. 3D illustrates an example representation 360 a third aspect of a content delivery scheme, in accordance with various embodiments. Specifically, FIG. 3D illustrates the delivery of individual content from the content provider 322 to individual devices 362a-j. Individual content refers to content that is specifically selected for and streamed to an individual device connected to the channel. Individual content streamed to a device may be selected based on specific preferences or affinities associated with that device. The individual content is targeted to the user of the device and based on what the user may enjoy and interactive with. In some embodiments, although the individual content is independently selected for each device, the individual content provided to two or more of the individual devices 362a-j may coincidentally include the same content. In some embodiments, the personalized content provided to an individual device may be selected from a database of content associated with the channel or from a collection of content associated with a user account of the individual device.

Figure 4A:
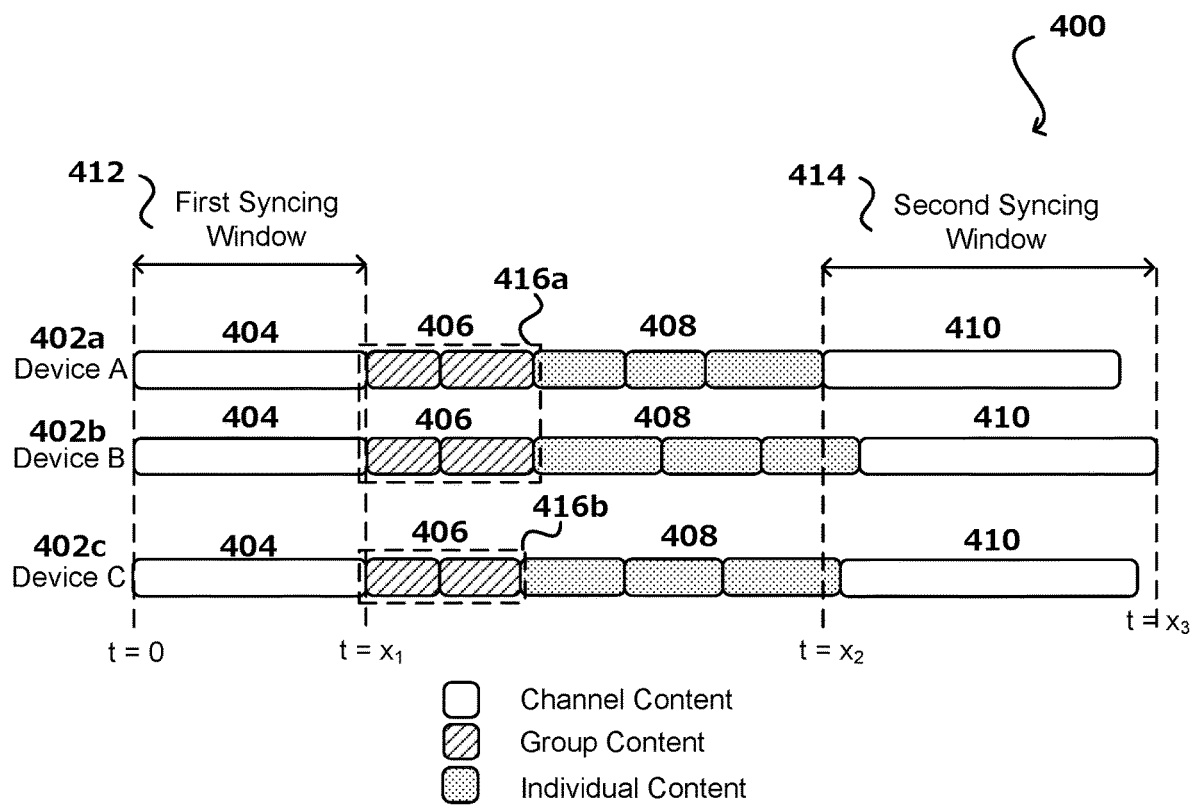
FIG. 4A illustrates an example of content scheduling, in accordance with various embodiments of the present disclosure.

FIG. 4A illustrates an example 400 of content scheduling, in accordance with various embodiments. In this example, and as discussed above, a certain streaming period (e.g, an hour of programming), a device may play a period of channel content, a period of group content, and a period of individual content. FIG. 4A illustrates such content schedules for a three example devices connected to a channel, device A 402a, device B 402b, and device C 402c. As illustrated, each of the devices receives a period of channel content 404, a period of group content 406, a period of individual content 408, and sync back to receiving another period of channel content 410. In this example, the three devices receive the first period of channel content 404 at the same time during a first syncing window 412, such as at the beginning of a broadcast. In various embodiments, the channel content includes a data stream of live content, pre-recorded content, or a combination thereof. For example, a host may record a "DJ break" introducing a new song, and the new song may following the introduction also as a part of the channel content broadcast to all of the devices. In this example, group content 406 is provided to the client devices following the channel content 404.

In some embodiments, the group content 406, although containing different content for different groups of devices, may be provided to the client devices at the same time or at different times, offset from each other. In this example, device A 402a and device B 402b are in the same group and thus receive the same group content 416a, while device C 402c is in a different group and receives different content 416b than devices A 402a and B 402b. Following the group content, each device may receive individual content 408 selected specific for the respective individual device. Thus, the individual content 408 for each device may be different. In some embodiments, individual content 408 and group content 406 may be played in any order, and in different order on different devices. Eventually, all of the devices may be synced back to all receiving the same channel content (i.e., a second period of channel content 410) during a second syncing window 414. In this example, the second period of channel content 410 is streamed to the devices at various offsets, such as a few seconds or minutes apart. This offset may occur when personalized content previously streamed to the devices (e.g., group content or individual content) may have different durations and thus end at different times. Accordingly, the channel content streamed to the devices following such content begins at different times, respectively.

Figure 4B:
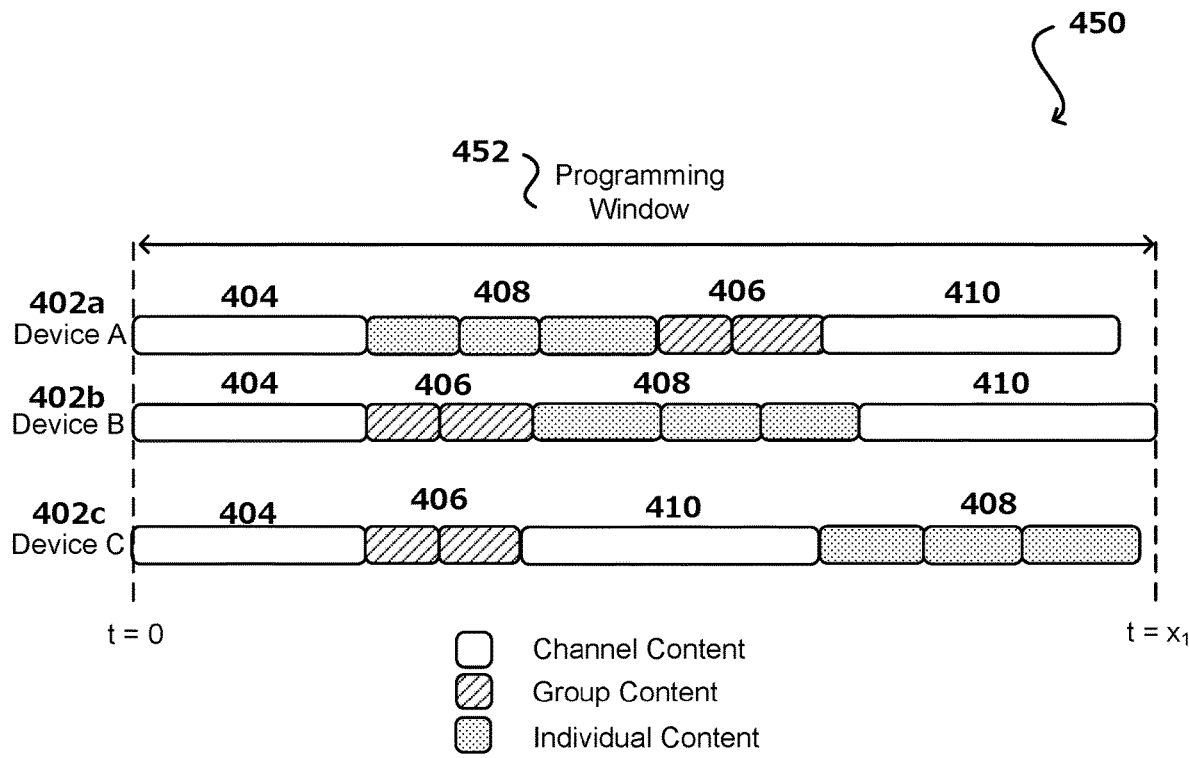
FIG. 4B illustrates another example of content scheduling, in accordance with various embodiments of the present disclosure.

FIG. 4B illustrates another example 450 of content scheduling, in accordance with various embodiments. In this example, the channel content, group content, and individual content may be transmitted to the individual devices 402a, 402b, 402c at various times and in different orders during a programming window 452. For example, for Device A 402a, the content ordering is channel content 404, then individual content 408, then group content 406, then more channel content 410. Meanwhile, Device B 402b receives channel content 404, group content 406, individual content 408, and then more channel content 410. Device C 402c may receive channel content 404, group content 406, more channel content 410, and then individual content 408. A programming window 452 may be any amount of time for which content is scheduled. For example, a programming window 452 may be an hour of content, a day of content, etc.

Figure 5:
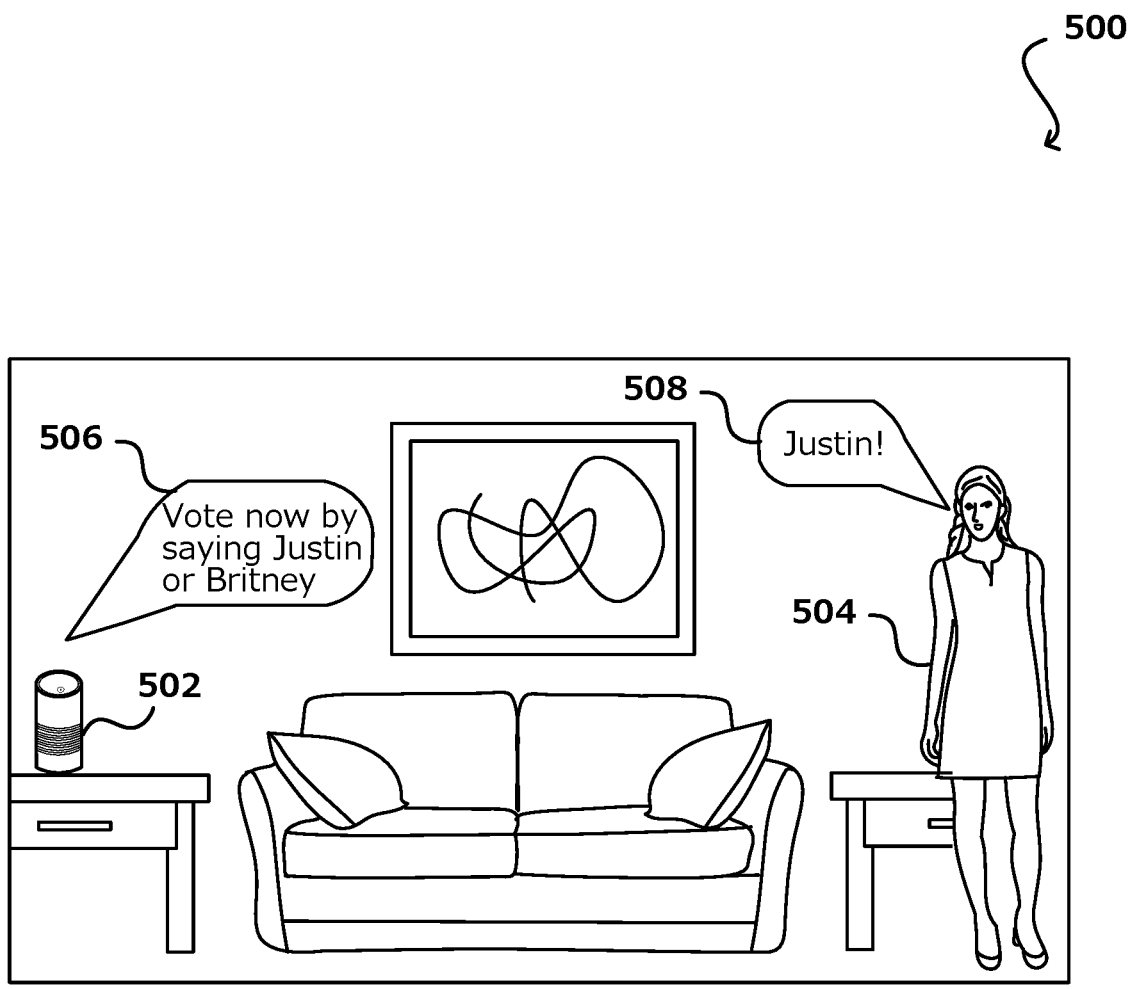
FIG. 5 illustrates an example scenario of content streaming with bi-directional communication, in accordance with various embodiments of the present disclosure.

FIG. 5 illustrates an example scenario 500 of content streaming with bi-directional communication, in accordance with various embodiments of the present disclosure. In various embodiments, a client device 502 connected to an audio streaming service may provide may provide bi-directional communication between a user 504 and the audio streaming service. Specifically, audio output data can be streamed from a server associated with a streaming service to the client device 502 over a network. The client device includes an audio output device such as a speaker, which may render the audio output data into audio (i.e., sound) that can be heard by the user 504. The client device 502 also includes an audio input device such as a microphone which can be activated to capture sound or utterances made by the user and convert the sound into user-generated audio input data. In some embodiments, the user may first say a wakeword to activate the microphone and record their response. In some other embodiments, or based on a setting selected by the user, the prompt itself may activate the microphone for a certain period of time following the prompt, such that the user can immediately say their response without having to say an additional wakeword. The user-generated audio input data may be transmitted from the client device 502 to the streaming service over the network. The user-generated audio input data may be process at the streaming service or at a server or distributed computing environment providing compute services to the streaming service.

The bi-directional communication system provided herein may be used to implement various applications and interactive features alongside content streaming. As illustrated, in various embodiments, the audio output data streamed from the streaming service to the client device 502 may include a prompt 506, aiming to illicit a response from the user 504. The user 504 may provide a response 508 by their response 508 out loud, as shown. In one example, and as illustrated in FIG. 5, users may be asked, as a part of the streaming content, to vote between two different artists in order for to select a song to play next. Thus, after the prompt 506 is announced through the client device, the user 504 may say their response 508 out loud, which may include their vote between the two artists. The response is capture by the client device and transmitted to the streaming service as user-generated audio input data. The streaming service, or associated computing service, may analyze the user-generated audio input data from many client devices and users in order to tabulate the voting results. In some embodiments, the user-generated audio input data is analyzed using automated speech recognition, which converts the audio data into another form, such as text, which may be more easily analyzed for content. In another example, instead of taking a poll or asking user to vote for something, the prompt 506 may ask users to enter a contest by saying a certain keyword or correctly answering a question. In this case, the response provided by the user may be analyzed to determine if the response matches the keyword or includes the correct answer to the question.

Figure 6:
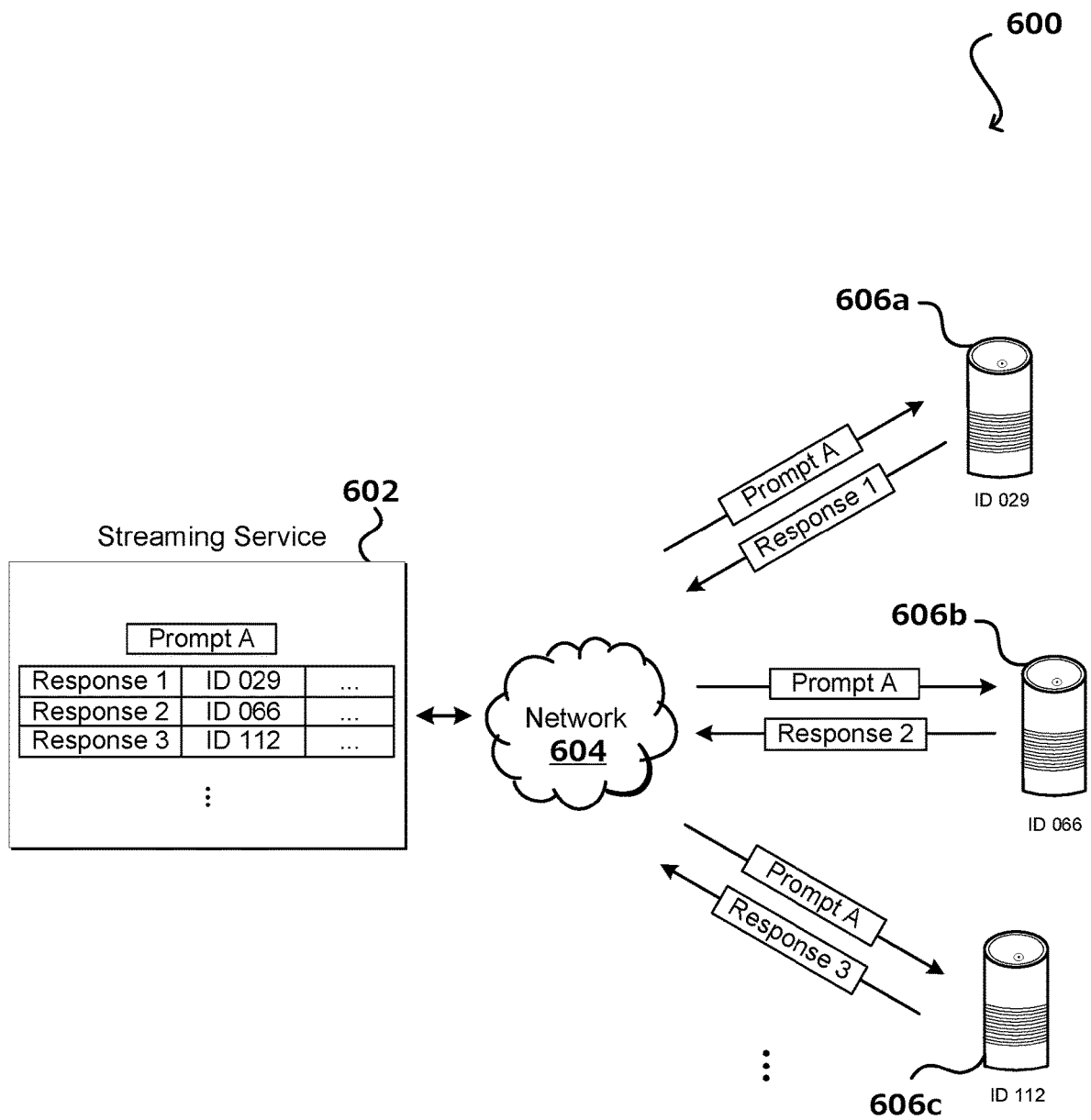
FIG. 6 illustrates an example representation of content streaming with prompts and user responses, in accordance with various embodiments of the present disclosure.

FIG. 6 illustrates an example representation 600 of bi-directional communication with content streaming, in accordance with various embodiments of the present disclosure. As illustrated, in various embodiments, a streaming service 602 may generate and stream content, such as audio content, to a plurality of client devices 606a, 606b, 606c over a network 604. The streaming content may include a particular prompt (e.g., "Prompt A", as shown), aiming to illicit responses from listeners. In some embodiments, the prompt may only be transmitted to a subset of listeners of a streaming service or channel based on certain user attributes. For example, the client devices 606a, 606b, 606c may all be associated with user accounts having certain attributes (e.g., affinity for pop music). The prompt may also be streamed to listeners are the same time or at different times, such as based on content scheduled or selected for individual listeners. In the illustrated embodiment, listeners of devices 606a, 606b, 606c each hear the prompt and respond to the prompt with a vocal response, which is captured by their respective devices 606a, 606b, 606c. The responses (e.g., Response 1, Response 2, Response 3) are transmitted as user-generated audio input data from the respective client devices 606a, 606b, 606c to the streaming service over the network 604. As mentioned, the streaming service may include various servers or distributed computing systems or services.

Once received, the response audio data representing the user response (i.e., utterance) can be processed to make various determinations. The response audio data may be processed using automated speech recognition to detect verbal content of a user response. For example, the response may be converted from audio data to text or strings, which can be further analyzed or manipulated, such detecting a vote for a certain song, an answer to a question. Thus, polls, contests, and other interactive tasks can be accomplished using the present techniques. In some embodiments, the user-generated audio data may be analyzed using automated speech recognitions techniques as a means of filtering out inappropriate or otherwise unsuitable content. Automated speech recognition may also be used to translate the audio data into text such that the content can be further analyzed, such as to sort, categorize, rank, or filter the user-generated audio data. The user-generated audio data may also be analyzed for audio quality, such as to filter out poor quality data. In some embodiments, the responses may be logged as entries in a response database at the streaming service. An entry may be generated for each response, which includes the response content, an ID associated with the client device, and any other attributes or metadata associated with the responses. The database may be viewable by a host. For example, the host may select one of the responses to play (i.e., stream to an audience), or select one of the responses as a winner of a contest.

Figure 7:
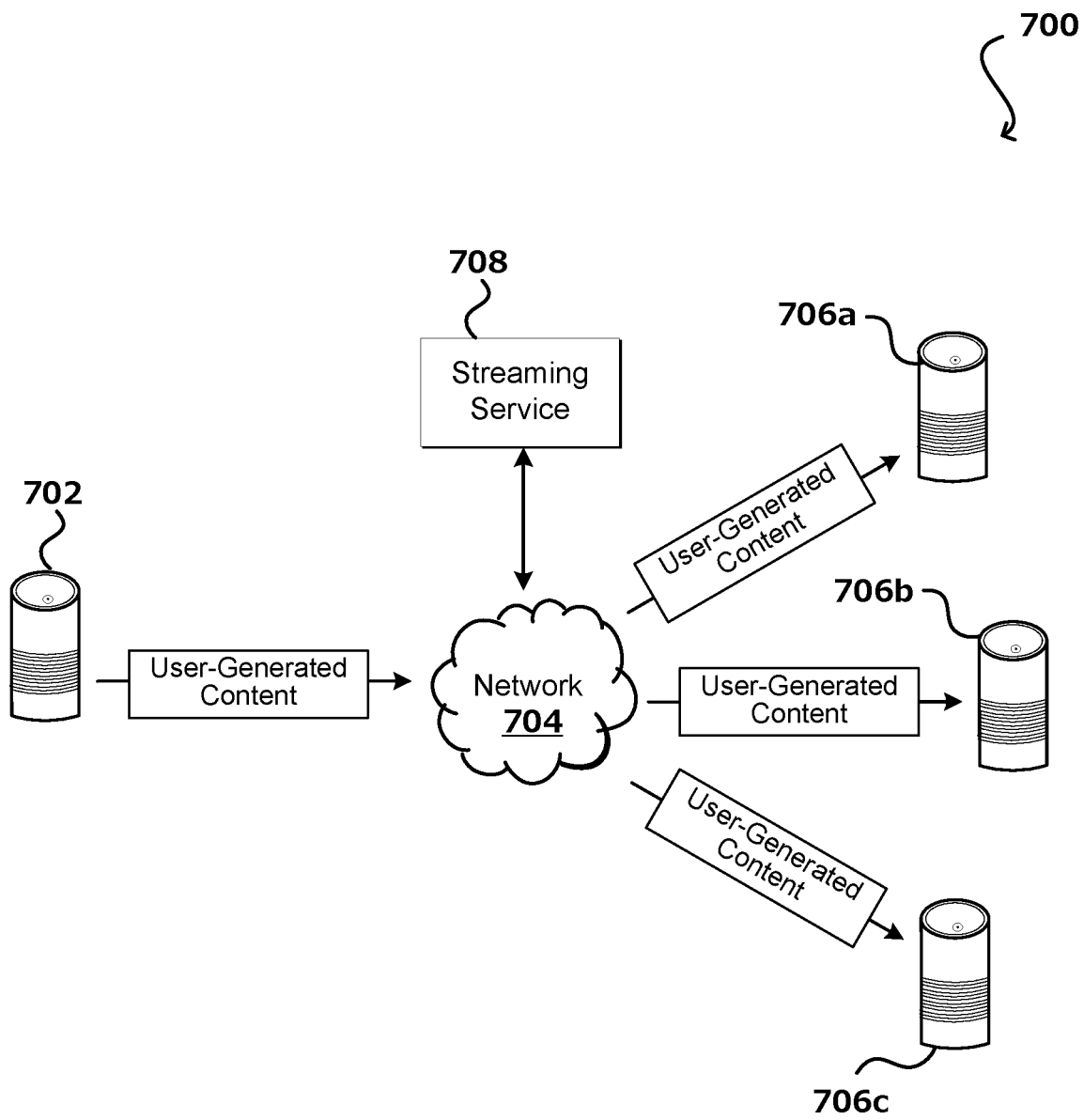
FIG. 7 illustrates an example representation of streaming user generated content, in accordance with various embodiments of the present disclosure.

FIG. 7 illustrates an example representation 700 of streaming user-generated content, in accordance with various embodiments of the present disclosure. In various embodiments, user-generated audio data (i.e., "user-generated content") may be captured by a client device 702, transmitted to a streaming service 708 from the client device 702 over a network 704, and then transmitted (i.e., streamed) to one or more client devices 706a, 706b, 706c from the streaming service 708 over the network 704. In some embodiments, the one or more client devices 706a, 706b, 706c to which the user-generated audio data is streamed includes the client device 702 through which the user-generated audio data was captured. In some other embodiments, the user-generated audio data is not transmitted back to the client device 702 through which it was captured. In some embodiments, the raw user-generated audio data received from the client device 702 is processed at the streaming service or associated computing service and a processed version of the user-generated audio data is transmitted to the one or more client devices 706a, 706b, 706c. For example, the raw user-generated audio data received from the client device 702 may be trimmed, enhanced, filtered, and the like, to improve its content and/or quality.

In some embodiments, the user-generated audio data may be stored and transmitted to the plurality of client devices at various later points in time, such as at a time that fits into the respective content schedules of the client devices. In some embodiments, the user-generated audio data may be streamed "live" or in real-time, such as to have the effect of the user-generated audio data being streamed as the user is speaking (i.e., being "on the air"). In some embodiments, multiple users may be transmitting their respective user-generated audio data to the streaming service through respective client devices and the user-generated audio data of all of the users are transmitted to the other client device, thereby having the effect of streaming a live conversation between multiple users. In some embodiments, the user-generated audio data may be analyzed using automated speech recognitions techniques as a means of automatically filtering out inappropriate or otherwise unsuitable content. This may be performed through automated speech recognition, in which the filtering may be applied using just a minimal time delay. Automated speech recognition may also be used to translate the audio data into text such that the content can be further analyzed, such as to sort, categorize, rank, or filter the user-generated audio data. The user-generated audio data may also be analyzed for audio quality, such as to filter out poor quality data. For example, a plurality of user-generated audio data may be received from a plurality of client devices, respectively, as entries, and only one or a subset of the entries can be selected to be streamed. Thus, the entries may each be analyzed against various content and quality criteria to select the best one or subset of the entries to be streamed. In some embodiments, the entries may be analyzed as described and recommendations may be made, including a subset of the entries which are deems optimal.

Figure 8:
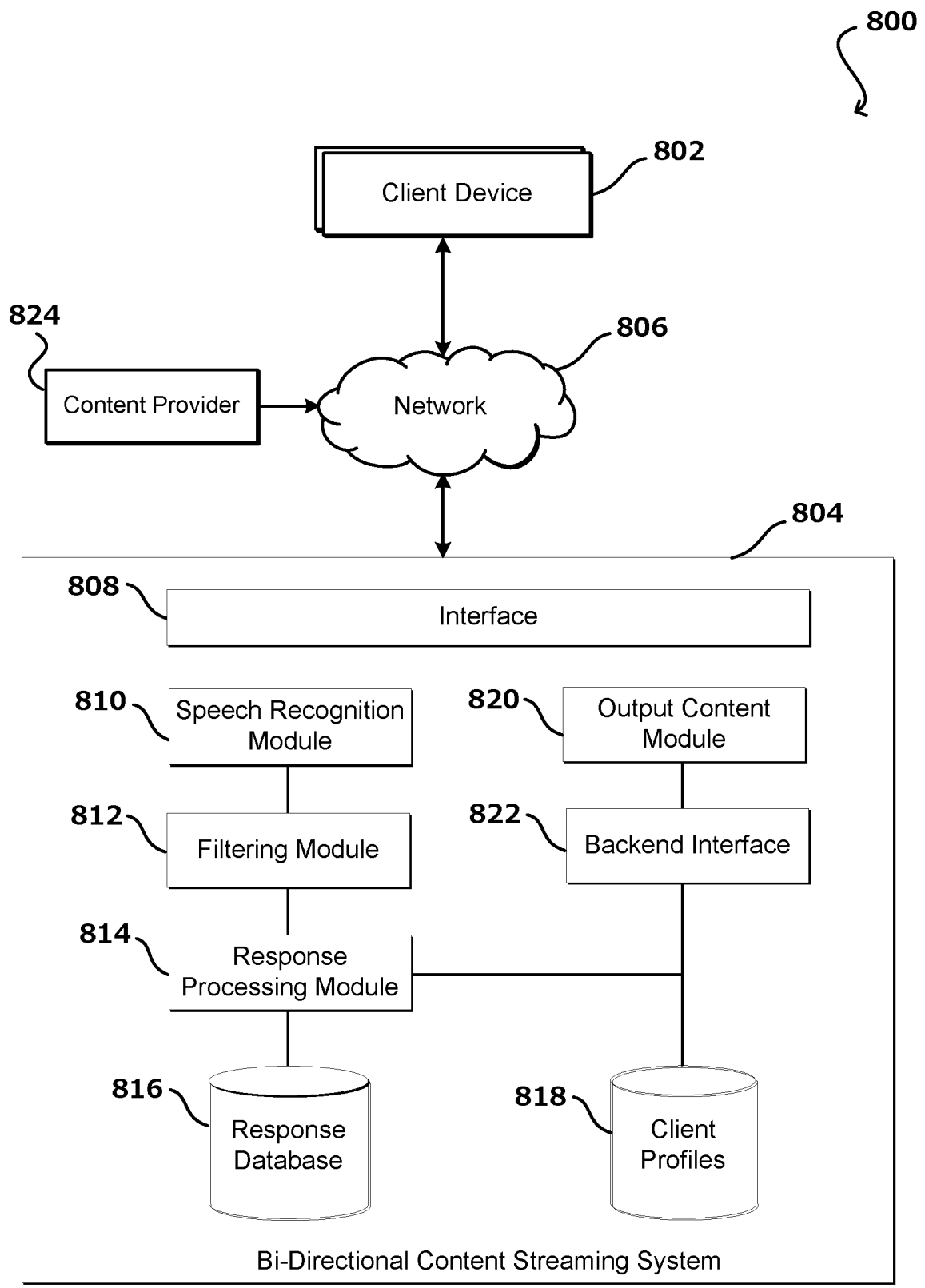
FIG. 8 illustrates an example computing system for content streaming with bi-directional communication, in accordance with various embodiments of the present disclosure.

FIG. 8 illustrates an example computing system 800 for content streaming with bi-directional communication, in accordance with various embodiments of the present disclosure. In various embodiments, a system 800 may enable a client device 802 to receive content, such as audio content, from a bi-directional content streaming system 804. The device client 802 may access a content provider 824, such as an audio streaming service or other web platform or service providing content to request audio content associated with a streaming channel. In some embodiments, the bi-directional content streaming system 804 may be implemented at one or more servers at content provider 824 or at a separate service provider that performs the present function using content provided by the content provider. The content provider 824 or service provider may utilizes the bi-directional content streaming system 804 to stream content to each client device 802 as well as to receive user-generated audio content from the client devices 802. In some other embodiments, the bi-directional content streaming system 804 may be implemented remote from the content provider 824, such that the content provider 824 provides data to the bi-directional content streaming system 804. In certain such cases, the bi-directional content streaming system 804 can either transmit the content back to the content provider 824 or directly to the client device 802.

The client device 802 may represent a client-side computer device that includes any type of computing devices having network connectivity, including audio playback devices, personal computers, tablet computers, smart phones, notebook computers, and the like. In various embodiments, the client device 802 includes an audio output device such as a speaker and an audio input device such as a microphone. Multiple client devices 802 may be connected to the bi-directional content streaming system 804 via the network 806, and the bi-directional content streaming system 804 may provide individualized service to each client device 802, such as based on the device type. In some embodiments, the client device 802 may be a virtual device, Web program, or software application that can communicate with the bi-directional content streaming system 804 directly or over the network 806, making and receiving requests and calls, and sending and receiving data. The network 806 can include any appropriate network, such as the Internet, a local area network (LAN), a cellular network, an Ethernet, Wi-Fi, Bluetooth, radiofrequency, or other such wired and/or wireless network. The bi-directional content streaming system 804 can include any appropriate resources for performing the various functions described herein, and may include various servers, data stores, and other such components known or used for providing content from across a network (or from the cloud).

In various embodiments, the bi-directional content streaming system 804 may include functional and data aspects illustrated herein as an interface 808, a speech recognition module 810, a filtering module 812, a response processing module 814, a response database 816, a client database 818, an output content module 820, and a backend interface 822. One or more of the modules and databases described above may be implemented jointly or separated further into additional modules.

The interface face 808 can facilitate communications between the client device 802 and the bi-directional content streaming system 804. Requests received by the bi-directional content streaming system 804 can be received by the interface 808. Example requests may include a request for content (e.g., connecting to a channel), a request to skip content or otherwise change content, among others. The interface 808 may also provide outputs from the bi-directional content streaming system 804 to the client 802, such as channel content and personalize content for rendering at the client device as an audio output. The bi-directional content streaming system 804 may receive content (e.g., songs, announcements, shows) from the content provider 824 via the interface 808. The interface 808 may also include components such as specific application programming interfaces (APIs), load balancers, request and/or data routers, and the like. The interface 808 may also facilitate communication with the content provider 802, whether local or remote. In various embodiments, the bi-directional content streaming system 804 may generate and stream audio output data to the client device 802 over the network 806. Conversely, the client device 802 may transmit user-generated audio input data to the bi-directional content streaming system 804. The interface 804 may facilitate transmitting of the audio output data to the client device 802 and receiving of the user-generated audio input data from the client device 802.

The speech recognition module 810 may be configured to analyze the user-generated using automated speech recognition or other speech recognition techniques to detect verbal content of a user response. For example, the response may be converted from audio data to text or strings, which can be further analyzed or manipulated, such detecting a vote for a certain song, an answer to a question. Thus, polls, contests, and other interactive tasks can be accomplished using the present techniques. Automated speech recognition may also be used to translate the audio data into text such that the content can be further analyzed, such as to sort, categorize, rank, or filter the user-generated audio data. In some embodiments, the speech recognition module generates a text representation of the user-generated audio data.

The filtering module 812 may analyze the user-generated audio data or the text representation of the user-generated audio data generated by the speech recognition module 610 to ensure that the data (audio or text) meets one or more content criteria, quality criteria, or both. For example, in some embodiments, the user-generated audio data may be analyzed by the filtering module as a means of automatically filtering out inappropriate or otherwise unsuitable content, such as profanity or other off color language. The filtering may be applied using just a minimal time delay. The filtering module 812 may also filter for various other content criteria, such as filtering out any user-generated data that does not contain one or more keywords. The user-generated audio data may also be analyzed for audio quality, such as to filter out poor quality data.

The response processing module 814 may consolidate, organized, or further process the received responses (i.e., user-generated audio data or their text-based representations as generated by the speech recognition module 810). For example, various content or quality based criteria may be applied to sort, categorize, rank, or further filter the received responses. In an example in which users are asked to cast a vote using a vocal response, the response processing module 814 can tabulate the votes. In another example, users may be asked to enter a contest by saying a certain keyword or correctly answering a question. In this case, the response processing module 814 can analyze the response to determine which responses are correct. The response processing module 814 may generate entries in the response database 816 for a certain prompt or activity. The database and the entries may be organized as dictated by the response processing module. In some embodiments, the response database 816 may include all the user responses for a certain prompt. The response processing module 814 may also access the client profiles database 818 to attach any user attributes or metadata to the user response when generating entries in the response database. Thus, certain insights may be gained. For example, it may be learned from this information that fans of a certain artist tend to vote for a certain other artist.

The output content module 820 generates streaming content to be transmitted to the client devices 802, which is come embodiments, may include user-generated audio data. In some embodiments, the one or more client device to which the user-generated audio data is streamed includes the client device through which the user-generated audio data was captured. In some other embodiments, the user-generated audio data is not transmitted back to the client device through which it was captured. In an example, the client device may record a user saying a message, such as a "shout-out" to a friend, a question for a program host or guest, or other such content. In some embodiments, the user-generated audio data may be stored and transmitted to the plurality of client devices at various later points in time, such as at a time that fits into the respective content schedules of the client devices. In some embodiments, the user-generated audio data may be streamed "live" or in real-time as the user says the message, such as to have the effect of the user speaking or announcing directly to other listeners (i.e., being "on the air"). In some embodiments, multiple users may be transmitting their respective user-generated audio data to the streaming service through respective client devices and the user-generated audio data of all of the users are transmitted to the other client device, thereby having the effect of streaming a live conversation between multiple users.

In some embodiments, the output content module 820 receives a processed version of the user-generated audio data, such as one processed through the filtering module, such that the content that is transmitted out to the other client devices meet various content or quality criteria. The back-end interface 612 may include a graphical interface that allows a host to observe and/or control certain aspects of the bi-directional content streaming system 804. For example, the host can see the received user responses, such as the entries in the response database. The host may also select contest winners, see up to the minute voting results, listen to the responses or messages to select for streaming, and perform various other monitoring and decision tasks.

Figure 9:
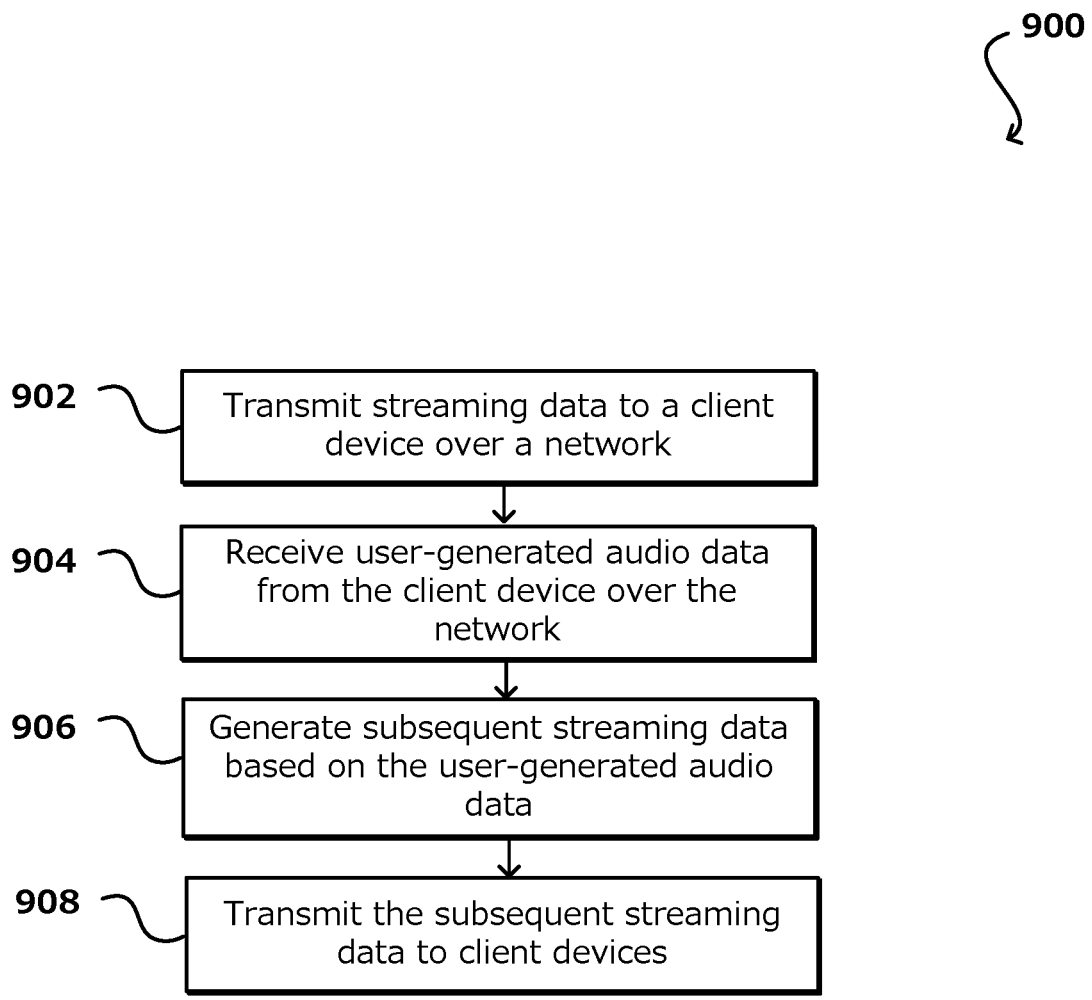
FIG. 9 illustrates an example process of content streaming with bi-directional communication, in accordance with various embodiments.

FIG. 9 illustrates an example process 900 of content streaming with bi-directional communication, in accordance with various embodiments. It should be understood that, for any process discussed herein, there can be additional, fewer, or alternative steps performed in similar or alternative orders, or in parallel, within the scope of the various embodiments. In this example, streaming data is transmitted 902 to a client device over a network. The streaming data may be rendered as audio output from the client device. User-generated audio input data may be received 904 from the client device over the network, in which the audio data corresponds to an utterance captured via an audio input device on the client device. For example, the utterance may correspond to spoken response or message by a user. Subsequent streaming data may be generated 906 based at least in part on the user-generated audio input data received from the client device. The subsequent streaming data may then be transmitted 908 to one or more client device (including, or not including, the client device from which the audio data was received) over the network. In various embodiments, the audio data received from the client device may be analyzed to determine that the audio data meets one or more quality and/or content criteria. For example, the audio data may need to above a certain sound quality threshold and be relevant to a certain subject matter. In some embodiments, the audio content may be analyzed using automated speech recognition, and can then be analyzed using keyword matching or various natural language processing techniques to determine if the audio data meets the content criteria. In some embodiments, the audio data transmitted to the one or more client devices may be a processed version of the original audio data received from the client device. In some embodiments, the audio data may be transmitted in real-time as it is received, producing a "live" experience. In some embodiments, the audio data may be transmitted after a time delay, and/or may be transmitted to different client devices at different times. In some embodiments, a plurality of audio data may be received from a plurality of different client devices, respectively, and the plurality of audio data is consolidated or stitched together and transmitted to the one or more client devices.

Figure 10:
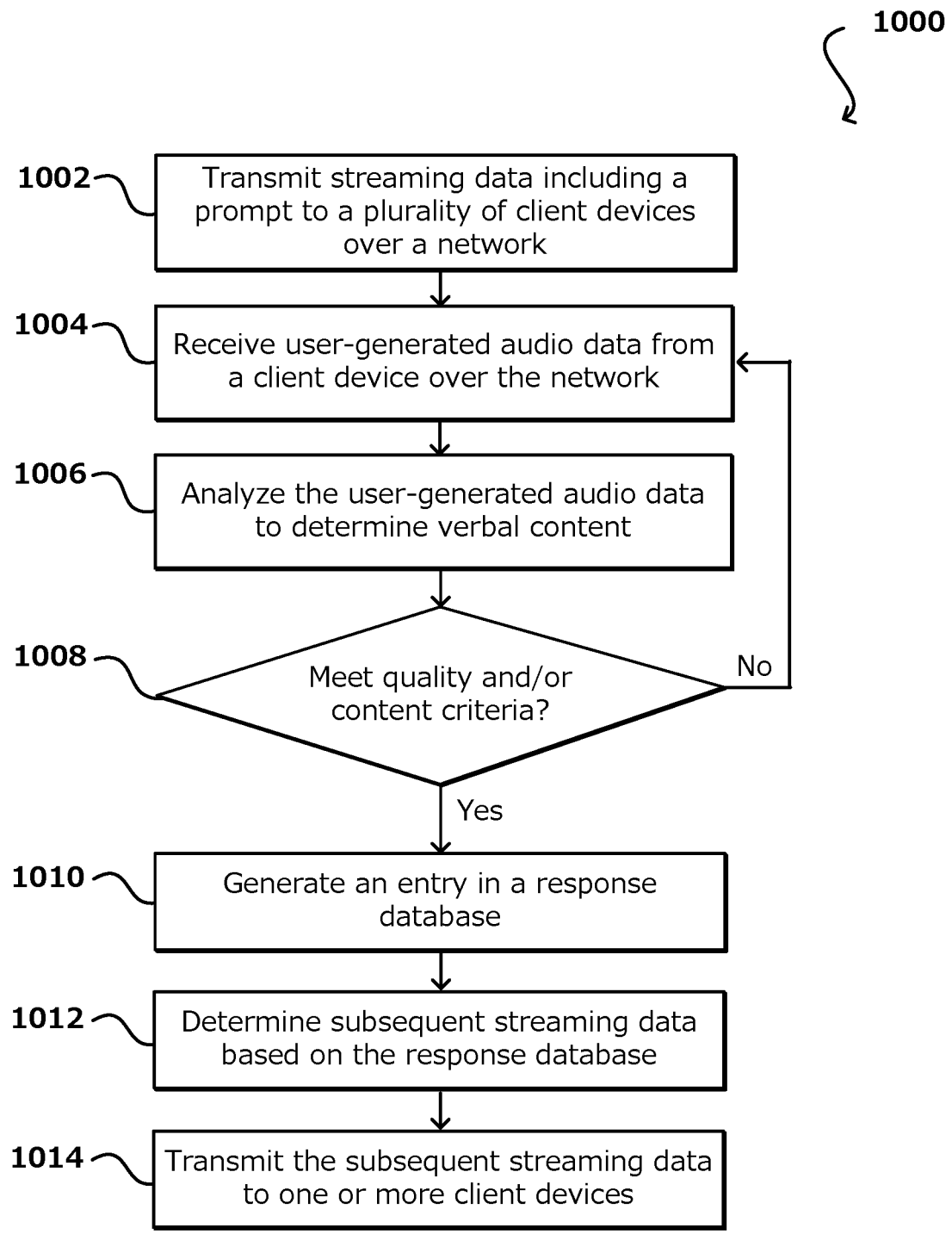
FIG. 10 illustrates an example process of content streaming with prompts and user responses, in accordance with various embodiments.

FIG. 10 illustrates an example process 1000 of content streaming with prompts and user responses, in accordance with various embodiments. In this example, streaming data is transmitted 1002 to a client device over a network. The data may be rendered as audio output from the client device, and the audio output associated with a prompt for a response from a user. Audio data may then be received 1004 from the client device, in which the audio data corresponds to an utterance captured via an audio input device of the client device. The utterance may include with a response to the prompt spoken by the user. The audio data received from the client device may be analyzed 1006 to determine verbal content of the audio data. It may be determined 1008 whether the audio data meets one or more criteria associated with the prompt. In some embodiments, the one or more criteria may include audio quality criteria such as noise, volume, clarity, and the like. The one or more criteria may also include content criteria such being relevant to certain subject matter, containing a keyword, or not having any profanity. If the audio data meets the criteria, then an entry may be generated 1010 in a database for the response. In some embodiments, the database may include a plurality of responses from respective client devices/users. For example, the entries may represent votes or contest entries. Thus, some subsequent streaming data may be determined 1012 based on one or more of the entries in the database and transmitted 1014 to one or more client devices over the network. In some embodiments, if the audio data does not meet the criteria, then an entry for the audio data is not generated and another user-generated audio data is received 1004 and analyzed 1006.

Figure 11:
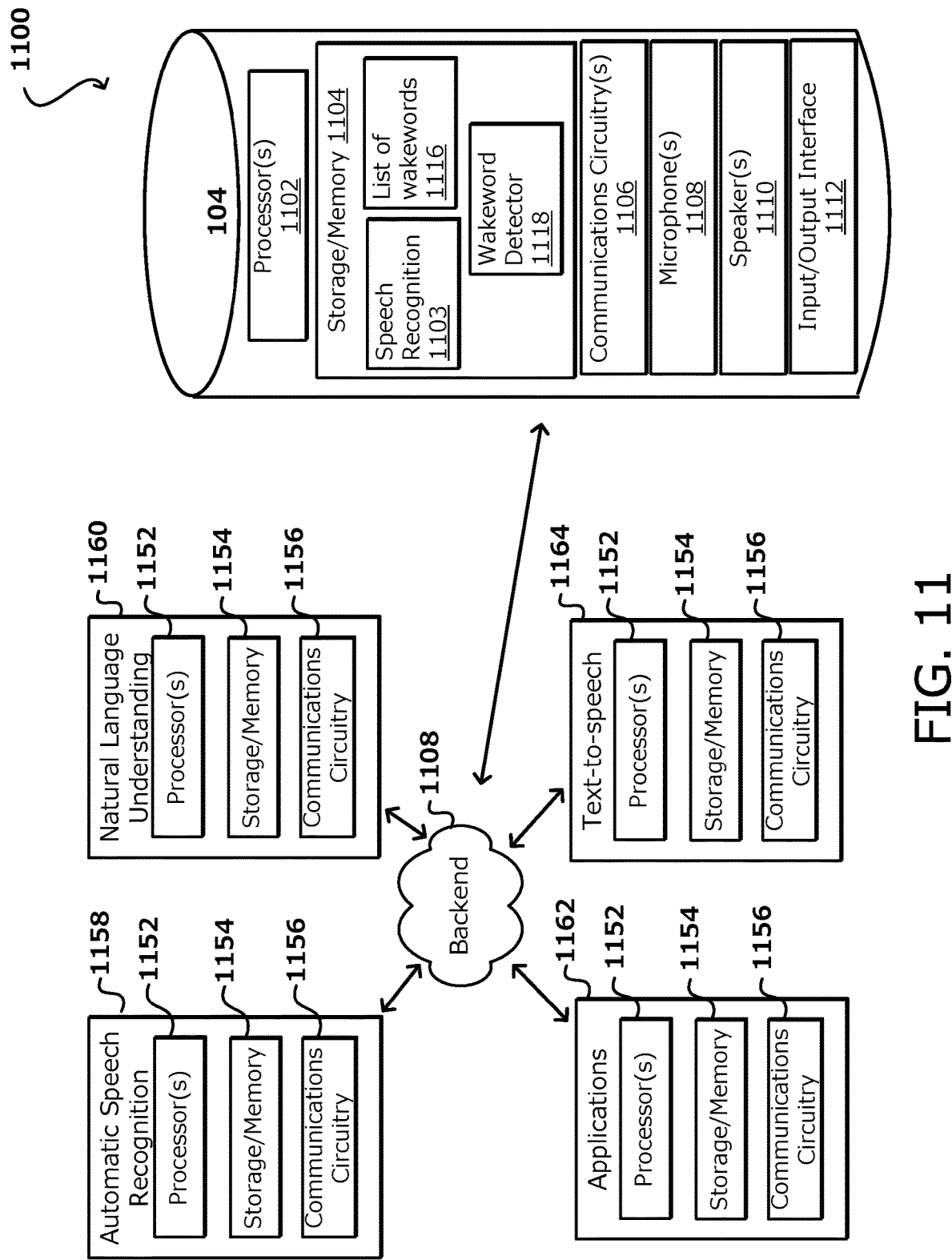
FIG. 11 illustrates an example implementation device, in accordance with various embodiments of the present disclosure.

FIG. 11 is another example environment 1100 for implementing aspects in accordance with various embodiments. In this example, voice-enabled communications device 102, in some embodiments, may correspond to any type of electronic device capable of being activated in response to detecting a specific sound. Voice-enabled communications device 102 may, in some embodiments, after detecting the specific sound (e.g., a wakeword), recognize commands (e.g., audio commands, inputs) within captured audio, and may perform one or more actions in response to the received commands. Various types of electronic devices may include, but are not limited to, notebook computers, ultrabooks, tablet computers, mobile phones, smart phones, personal data assistants, video gaming consoles, televisions, set top boxes, smart televisions, portable media players, and wearable computers (e.g., smart watches, smart glasses, bracelets, etc.), display screens, displayless devices (e.g., Amazon Echo), other types of display-based devices, smart furniture, smart household devices, smart vehicles, smart transportation devices, and/or smart accessories, among others. In some embodiments, voice-enabled communications device 102 may be relatively simple or basic in structure such that no mechanical input option(s) (e.g., keyboard, mouse, trackpad) or touch input(s) (e.g., touchscreen, buttons) may be provided. For example, voice-enabled communications device 102 may be capable of receiving and outputting audio, and may include power, processing capabilities, storage/memory capabilities, and communication capabilities.

Voice-enabled communications device 102 may include a minimal number of input mechanisms, such as a power on/off switch, however primary functionality, in one embodiment, of voice-enabled communications device 102 may solely be through audio input and audio output. For example, voice-enabled communications device 102 may listen for a wakeword by continually monitoring local audio. In response to the wakeword being detected, voice-enabled communications device 102 may establish a connection with backend server 1008, send audio input data to backend server 1008, and await/receive a response from backend server 1008. In some embodiments, however, non-voice-enabled devices may also communicate with backend server 1008 (e.g., push-to-talk devices). Voice-enabled communications device 102 may include one or more processors 1102, storage/memory 1104, communications circuitry 1106, one or more microphones 1108 or other audio input devices (e.g., transducers), one or more speakers 1110 or other audio output devices, as well as an optional visual input/output ("I/O") interface 1112. However, one or more additional components may be included within voice-enabled communications device 102, and/or one or more components may be omitted. For example, voice-enabled communications device 102 may include a power supply or a bus connector. As another example, voice-enabled communications device 102 may not include a visual I/O interface.

Furthermore, while multiple instances of one or more components may be included within voice-enabled communications device 102, for simplicity only one of each component has been shown. Processor(s) 1102 may include any suitable processing circuitry capable of controlling operations and functionality of voice-enabled communications device 102, as well as facilitating communications between various components within voice-enabled communications device 102. In some embodiments, processor(s) 1102 may include a central processing unit ("CPU"), a graphic processing unit ("GPU"), one or more microprocessors, a digital signal processor, or any other type of processor, or any combination thereof. In some embodiments, the functionality of processor(s) 1102 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 1102 may include its own local memory, which may store program modules, program data, and/or one or more operating systems. However, processor(s) 1102 may run an operating system ("OS") for voice-enabled communications device 102, and/or one or more firmware applications, media applications, and/or applications resident thereon. Storage/memory 1104 may include one or more types of storage mediums such as any volatile or non-volatile memory, or any removable or non-removable memory implemented in any suitable manner to store data on voice-enabled communications device 102. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD ROM, digital versatile disk ("DVD") or other optical storage medium, magnetic cassettes, magnetic tape, magnetic disk storage or other magnetic storage devices, RAID storage systems, or any other storage type, or any combination thereof.

Furthermore, storage/memory 1104 may be implemented as computer-readable storage media ("CRSM"), which may be any available physical media accessible by processor(s) 1102 to execute one or more instructions stored within storage/memory 1104. In some embodiments, one or more applications (e.g., gaming, music, video, calendars, lists, etc.) may be run by processor(s) 1102, and may be stored in memory 1104. In some embodiments, storage/memory 1104 may include one or more modules and/or databases, such as speech recognition module 1103, list of wakewords database 1116, and wakeword detection module 1118. Speech recognition module 1103 may, for example, include an automatic speech recognition ("ASR") component that recognizes human speech in detected audio. Speech recognition module 1103 may also include a natural language understanding ("NLU") component that determines user intent based on the detected audio. Also included within speech recognition module 1103 may be a text-to-speech ("TTS") component capable of converting text to speech to be outputted by speaker(s) 1110, and/or a speech-to-text ("STT") component capable of converting received audio signals into text to be sent to backend server 1108 for processing.

List of wakewords database 1116 may be a database stored locally on voice-enabled communications device 102 that includes a list of a current wakeword for voice-enabled communications device 102, as well as one or more previously used, or alternative, wakewords for voice-enabled communications device. In some embodiments, user 102 may set or program a wakeword for voice-enabled communications device 102. The wakeword may be programmed directly on voice-enabled communications device 102, or a wakeword or words may be set by the individual via a backend server application (app) that is in communication with backend server 1108. For example, a user may use their mobile device having the backend server application running thereon to set the wakeword. The specific wakeword may then be communicated from the mobile device to backend server 1108, which in turn may send/notify voice-enabled communications device 102 of the individual's selection for the wakeword. The selected activation may then be stored in list of wakewords database 1116 of storage/memory 1104.

Wakeword detection module 1118 may include an expression detector that analyzes an audio signal produced by microphone(s) 1108 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 1108. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 1108. The expression detector may then compare that score to a threshold to determine whether the wakeword will be declared as having been spoken. In some embodiments, a keyword spotter may be use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally a portion of an audio signal is analyzed by comparing its HMM model to an HMM model of the trigger expression, yielding a feature score that represents the similarity of the audio signal model to the trigger expression model. In practice, an HMM recognizer may produce multiple feature scores, corresponding to different features of the HMM models.

An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice-enabled communications device 102 may then begin sending the audio signal to backend server 1108 for detecting and responds to subsequent utterances made by a user.

Communications circuitry 1106 may include any circuitry allowing or enabling voice-enabled communications device 102 to communicate with one or more devices, servers, and/or systems. For example, communications circuitry 1106 may facilitate communications between voice-enabled communications device 102 and backend server 1108. Communications circuitry 1106 may use any communications protocol, such as any of the previously mentioned exemplary communications protocols. In some embodiments, voice-enabled communications device 102 may include an antenna to facilitate wireless communications with a network using various wireless technologies (e.g., Wi-Fi, Bluetooth, radiofrequency, etc.). In yet another embodiment, voice-enabled communications device 102 may include one or more universal serial bus ("USB") ports, one or more Ethernet or broadband ports, and/or any other type of hardwire access port so that communications circuitry 1106 allows voice-enabled communications device 102 to communicate with one or more communications networks.

Voice-enabled communications device 102 may also include one or more microphones 1108 and/or transducers. Microphone(s) 1108 may be any suitable component capable of detecting audio signals. For example, microphone(s) 1108 may include one or more sensors for generating electrical signals and circuitry capable of processing the generated electrical signals. In some embodiments, microphone(s) 1108 may include multiple microphones capable of detecting various frequency levels. As an illustrative example, voice-enabled communications device 102 may include multiple microphones (e.g., four, seven, ten, etc.) placed at various positions about voice-enabled communications device 102 to monitor/capture any audio outputted in the environment where voice-enabled communications device 102 is located.

The various microphones 1108 may include some microphones optimized for distant sounds, while some microphones may be optimized for sounds occurring within a close range of voice-enabled communications device 102. Voice-enabled communications device 102 may further include one or more speakers 1110. Speaker(s) 1110 may correspond to any suitable mechanism for outputting audio signals. For example, speaker(s) 1110 may include one or more speaker units, transducers, arrays of speakers, and/or arrays of transducers that may be capable of broadcasting audio signals and or audio content to a surrounding area where voice-enabled communications device 102 may be located. In some embodiments, speaker(s) 1110 may include headphones or ear buds, which may be wirelessly wired, or hard-wired, to voice-enabled communications device 102, that may be capable of broadcasting audio. In some embodiments, one or more microphones 1108 may serve as input devices to receive audio inputs, such as speech. Voice-enabled communications device 102, may then also include one or more speakers 1110 to output audible responses. In this manner, voice-enabled communications device 102 may function solely through speech or audio, without the use or need for any input mechanisms or displays. In one exemplary embodiment, voice-enabled communications device 102 includes I/O interface 1112.

The input portion of I/O interface 1112 may correspond to any suitable mechanism for receiving inputs from a user of voice-enabled communications device 102. For example, a camera, keyboard, mouse, joystick, or external controller may be used as an input mechanism for I/O interface 1112. The output portion of I/O interface 1112 may correspond to any suitable mechanism for generating outputs from voice-enabled communications device 102. For example, one or more displays may be used as an output mechanism for I/O interface 1112. As another example, one or more lights, light emitting diodes ("LEDs"), or other visual indicator(s) may be used to output signals via I/O interface 1112 of voice-enabled communications device 102. In some embodiments, one or more vibrating mechanisms or other haptic features may be included with I/O interface 1112 to provide a haptic response to user 102 from voice-enabled communications device 102. Persons of ordinary skill in the art will recognize that, in some embodiments, one or more features of I/O interface 1112 may be included in a purely voice-enabled version of voice communications device 102. For example, one or more LED lights may be included on voice-enabled communications device 102 such that, when microphone(s) 1108 receive audio from user 102, the one or more LED lights become illuminated signifying that audio has been received by voice-enabled communications device 102.

In some embodiments, I/O interface 1112 may include a display screen and/or touch screen, which may be any size and/or shape and may be located at any portion of voice-enabled communications device 102. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon. FIG. 11 also includes backend server 1166, as mentioned previously, which may be in communication with voice-enabled communications device 102. Backend server 1166 (e.g., part of a resource provider environment) includes various components and modules including, but not limited to, automatic speech recognition ("ASR") module 1158 (which may include, for example, speech-to-text ("STT") functionality), natural language understanding ("NLU") module 1160, applications module 1162, and text-to-speech ("TTS") module 1164.

In some embodiments, backend server 1166 may also include computer readable media, including, but not limited to, flash memory, random access memory ("RAM"), and/or read-only memory ("ROM"). Backend server 1166 may also include various modules that store software, hardware, logic, instructions, and/or commands, such as, a speaker identification ("ID") module, a user profile module, or any other module, or any combination thereof. The speech-to-text functionality and text-to-speech functionality may be combined into a single module capable of performing both STT and TTS processing, or separate TTS and STT modules may, alternatively, be used. ASR module 1158 may be configured such that it recognizes human speech in detected audio, such as audio captured by voice-enabled communications device 102, which is then sent to backend server 1166. ASR module 1158 may include, in one embodiment, one or more processor(s) 1152, storage/memory 1154, and communications circuitry 1156.

Processor(s) 1152, storage/memory 1154, and communications circuitry 1156 may, in some embodiments, be substantially similar to processor(s) 1102, storage/memory 1104, and communications circuitry 1106, which are described in greater detail above, and the aforementioned descriptions of the latter may apply. NLU module 1160 may be configured such that it determines user intent based on the detected audio received from voice-enabled communications device 102. NLU module 1160 may include processor(s) 1152, storage/memory 1154, and communications circuitry 1156. Applications module 1162 may, for example, correspond to various action specific applications or servers capable of processing various task specific actions. Applications module 1162 may further correspond to first party applications and/or third party applications operable to perform different tasks or actions. For example, based on the context of audio received from voice-enabled communications device 102, backend server 1166 may use a certain application to perform an action, such refining an active play queue of media content.

Applications module 1162 may include processor(s) 1152, storage/memory 1154, and communications circuitry 1156. As an illustrative example, applications module 1162 may correspond to a media service. The electronic media service application of the applications module 1162 can be associated with a customer account. The customer account can include at least one profile stored in, for example, user information that can be linked to the electronic media service application in applications module 1162. Audio input data can be received at automatic speech recognition module 1158 from voice communications device 102. The automatic speech recognition module 1158 can use automatic speech recognition (ASR) techniques on the audio input data to generate text data of the audio input data. The natural language understanding module 1160 can use natural language understanding (NLU) techniques on the text data to determine refinement/attribute information to manage the active play queue.

The electronic media service application of the applications module 1162 can receive information that can be used to refine or otherwise control the playback of media content, where refining the playback of media content can include filtering media content from an active play queue of media content, adding media content to the active play queue of media content, re-ordering the sequence of content in the play-queue, supplementing the active play queue, and/or changing the frequency of playback of content in the play-queue. In accordance with an embodiment, the application can determine whether there is an active play queue of media content configured to play on the voice communications device, such as a playlist of music, a station of music, a mix of songs, etc. In the situation where there is no media content being played by the voice communications device or no active play queue of media content, the electronic media service application determines media content using information in the request. The information can be used to search a catalog of media content to identify media content in response to the spoken question or request. For example, the information can be used to identify media content associated with a mood, a tempo, a genre, an artist, a year, a decade, an activity as well as any other topic or interest. The identified media can thereafter be played using the voice communications device. In the situation where there is an active play queue of media content, the information can be used to refine the play queue. For example, the information can include instructions such as refinement instructions that can be used to filter the play queue and/or add media content to the play queue from a catalog of media content. In various embodiments, the user can further refine the playback of media content. For example, in the situation where the user is engaging in a multi-turn dialog interaction with the voice communications device, where the user sends multiple requests to the voice communications device to refine the media playing, the user can first instruct the device to play "happy" music. If the user desires "happier" music, the user can instruct the voice communications device to play "happier" music.

TTS module 1164 may employ various text-to-speech techniques. It should be noted that techniques for taking text and converting it into audio input data that can represent speech are well known in the art and need not be described in further detail herein, any suitable computer implemented techniques may be used. TTS module 1164 may also include processor(s) 1152, storage/memory 1154, and communications circuitry 1156. Persons of ordinary skill in the art will recognize that although each of ASR module 1158, NLU module 1160, applications module 1162, and TTS module 1164 include instances of processor(s) 1152, storage/memory 1154, and communications circuitry 1156, those instances of processor(s) 1152, storage/memory 1154, and communications circuitry 1156 within each of ASR module 1158, NLU module 1160, applications module 1162, and STT/TTS module 1164 may differ. For example, the structure, function, and style of processor(s) 1152 within ASR module 1158 may be substantially similar to the structure, function, and style of processor(s) 1152 within NLU module 1160, however the actual processor(s) 1152 need not be the same entity.

Figure 12:
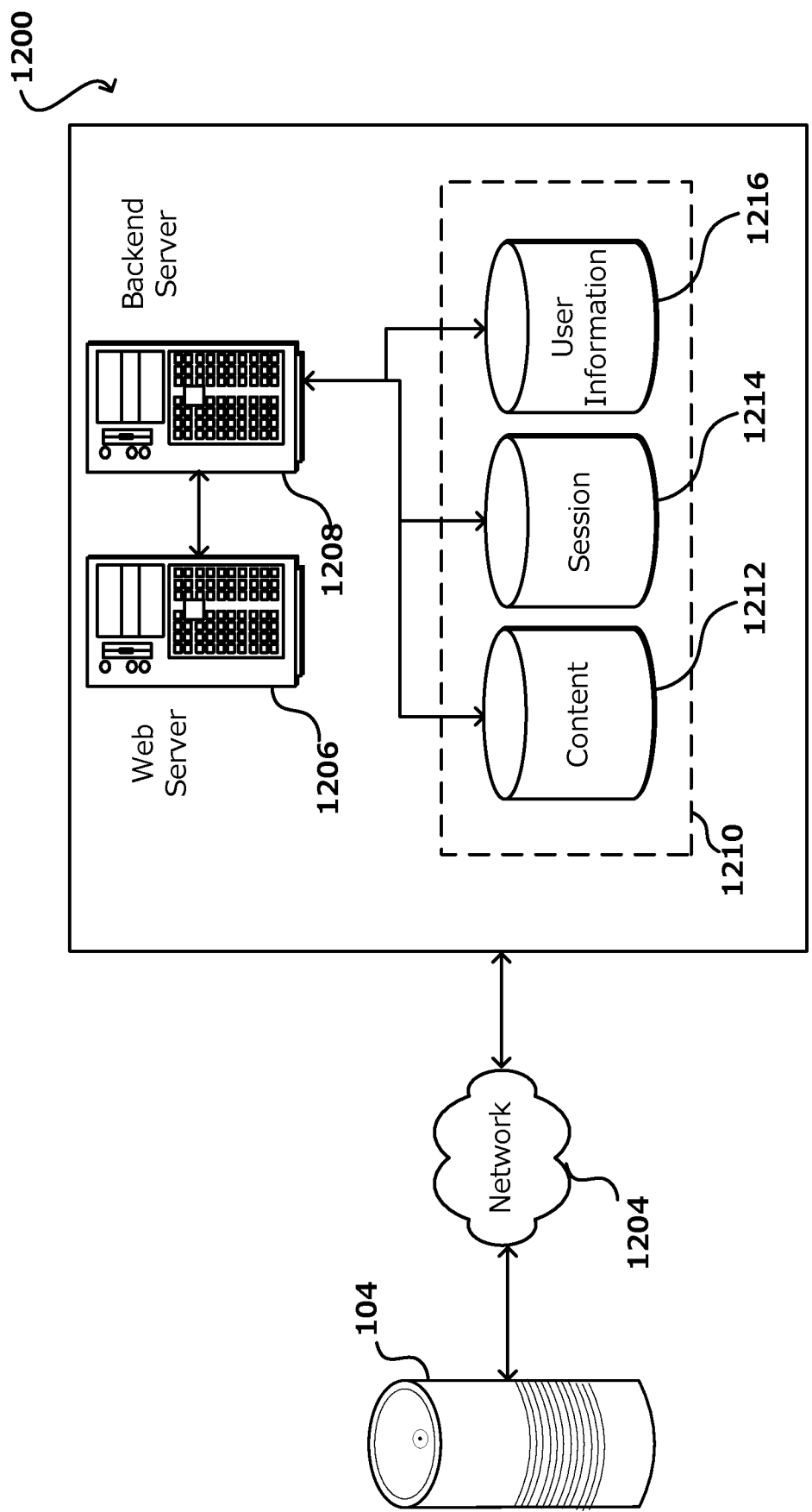
FIG. 12 illustrates an example implementation environment, in accordance with various embodiments of the present disclosure.

In accordance with various embodiments, different approaches can be implemented in various environments in accordance with the described embodiments. For example, FIG. 12 illustrates an example of an environment 1200 for implementing aspects in accordance with various embodiments (e.g., a resource provider environment). In accordance with various embodiments, different approaches can be implemented in various environments in accordance with the described embodiments. For example, FIG. 12 illustrates an example of an environment 1200 for implementing aspects in accordance with various embodiments (e.g., a resource provider environment). As will be appreciated, although a Web-based environment is used for purposes of explanation, different environments may be used, as appropriate, to implement various embodiments. The system includes voice communications device 102, which can include any appropriate device operable to send and receive requests, messages or information over network 1204 and convey information back to an appropriate device. The network can include any appropriate network, including a telephone network provided by a telecommunication operator, an intranet, the Internet, a cellular network, a local area network, wireless network, or any other such network or combination thereof. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one backend server 1208 and a data store 1210. It should be understood that there can be several backend servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The backend server 1208 can include any appropriate hardware and software for integrating with the data store 1210 as needed to execute aspects of one or more applications for the client device and handling a majority of the data access and business logic for an application. The application server provides access control services in cooperation with the data store and is able to analyze audio date and other data as well as generate content such as text, graphics, audio and/or video to be transferred to the user, which may be served to the user by the Web server 1206 in the form of HTML, XML or another appropriate structured language in this example. The handling of all requests and responses, as well as the delivery of content between the voice communications device 102 and the backend server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be other information that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the backend server 1208 and obtain, update or otherwise process data in response thereto. In one such example, the voice communications device can receive a request to refine the playback of media content, such as music, news, audio books, audio broadcasts, and other such content. In this case, the data store might access the user information to verify the identity of the user and access a media service to determine media content the user is associated with. The user's speech can be analyzed and used to generate an updated active play queue or initiate the playback of media content.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein. The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C# or C++ or any scripting language, such as Perl, Python or TCL, as well as combinations thereof. The server(s) may also include database servers, including without limitation those commercially available from Oracle, Microsoft, Sybase and IBM. The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad, microphone, camera, etc.) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
    at least one computing device processor; and
    a memory device including instructions that, when executed by the at least one computing device processor, cause the system to:
        transmit first audio output data over an audio streaming channel to a user device connected to an audio streaming service, the user device having a speaker and a microphone, the first audio output data rendered into sound via the speaker, the sound corresponding to a prompt for a response from a user;
        activate a recording function of the user device upon the first audio output data being rendered into sound via the speaker, wherein the recording function is otherwise activated upon detecting a wakeword;
        receive audio input data from the user device, the audio input data representing an utterance received by the microphone, the utterance responsive to the prompt;
        generate user response data from the audio input data by performing automated speech recognition on the audio input data;
        analyze the user response data to determine that the user response data meets one or more criteria associated with the quality and content of the user response data;
        generate an entry in a user response database associated with the prompt, the entry based on the user response data;

determine second audio output data for transmission based on one or more entries in the user response database; and transmit the audio input data or an edited version of the audio input data to one or more user devices over the audio streaming channel.

2. The system of claim 1, wherein the prompt is associated with a poll and the user response data is associated with a vote associated with the poll, and wherein the second audio output data is determined based on votes associated with the poll.

3. The system of claim 1, wherein the instructions when executed further cause the system to:

analyzing the audio input data using automated speech recognition;

determining verbal content of the audio data; and determining that the verbal content includes one or more keywords associated with the prompt.

4. A computer-implemented method, comprising:

transmitting streaming data to a client device over a network, the streaming data rendered as audio output from the client device, the audio output associated with a prompt;

activating a recording function of the client device upon the audio output being emitted from the client device, wherein the recording function is otherwise activated upon detecting a wakeword;

receiving audio data from the client device, the audio data corresponding to an utterance captured via an audio input device of the client device, the utterance associated with a response to the prompt;

analyzing the audio data to determine that the audio data meets one or more criteria associated with the prompt;

generating an entry in a database associated with the audio data;

determining subsequent streaming data for transmission based on one or more entries in the database; and transmitting the audio data or an edited version of the audio data to one or more client devices over the network.

5. The computer-implemented method of claim 4, wherein the one or more criteria includes a measure of audio quality.

6. The computer-implemented method of claim 4, further comprising:

analyzing the audio data using automated speech recognition;

determining verbal content of the audio data; and determining that the verbal content meets ones or more content criteria.

7. The computer-implemented method of claim 6, further comprising:

determining that at least a subset of the one or more entries in the database meets one or more content criteria;

selecting at least one entry in the subset; and determining the subsequent streaming data based on the at least one selected entry.

8. The computer-implemented method of claim 4, further comprising:

determining that at least a subset of the one or more entries in the database is associated with a verbal content; and determining the subsequent streaming data based on the verbal content.

9. The computer-implemented method of claim 4, further comprising:

analyzing the one or more entries in the database with respect to one or more selection criteria; and generating a recommendation indicating a subset of the one or more entries.

10. The computer-implemented method of claim 4, further comprising:

transmitting the audio data or edited version of the audio data to the one or more client devices at the same time or at different times.

11. The computer-implemented method of claim 4, further comprising:

obtaining a profile associated the client device, the profile including one or more attributes; and determining to transmit the streaming data to the client device based on at least one of the one or more attributes.

12. The computer-implemented method of claim 4, further comprising:

receiving the audio data from the client device within a certain time window after transmission of the streaming data.

13. The computer-implemented method of claim 12, further comprising:

transmitting instruction data to the client device, the instruction data causing the client device to activate the audio input device for a period of time within the time window.

14. The computer-implemented method of claim 4, further comprising:

transmitting the streaming data to a second client device over the network at a different time than transmitting the streaming data to the first client device;

receiving second audio data from the second client device; and generating a second entry in the database associated with the second audio data.

15. A system, comprising:

at least one computing device processor; and a memory device including instructions that, when executed by the at least one computing device processor, cause the system to:

transmit streaming data to a client device over a network, the streaming data rendered as audio output from the client device;

activate a recording function of the client device upon the audio output being emitted from the client device, wherein the recording function is otherwise activated upon detecting a wakeword;

receive audio data from the client device over the network, the audio data corresponding to an utterance captured via an audio input device of the client device;

generate subsequent streaming data based at least in part on the audio data; and transmit the audio data or an edited version of the audio data to one or more client devices over the network.

16. The system of claim 15, wherein the instructions when executed further cause the system to:

receive a plurality of audio data from a plurality of client devices over the network, respectively; and generate the subsequent streaming data based at least in part on the plurality of audio data.

17. The system of claim 15, wherein the instructions when executed further cause the system to:

generate the subsequent streaming data and transmit the subsequent streaming data in real-time upon receiving the audio data.

18. The system of claim 15, wherein the instructions when executed further cause the system to:
   analyze the audio data to determine that the audio data meets at least one quality or content criteria.

19. The system of claim 15, wherein the instructions when executed further cause the system to:
   transmit the audio data or edited version of the audio data to the one or more client devices at the same time or at different times.

* * * * *